United States Patent
Kim et al.

(10) Patent No.: US 11,477,681 B2
(45) Date of Patent: Oct. 18, 2022

(54) METHOD AND DEVICE FOR COLLECTING AND REPORTING CELL MEASUREMENT INFORMATION IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/979,376

(22) PCT Filed: May 7, 2019

(86) PCT No.: PCT/KR2019/005426
§ 371 (c)(1),
(2) Date: Sep. 9, 2020

(87) PCT Pub. No.: WO2019/221436
PCT Pub. Date: Nov. 21, 2019

(65) Prior Publication Data
US 2020/0413279 A1    Dec. 31, 2020

(30) Foreign Application Priority Data

May 16, 2018 (KR) .......... 10-2018-0056202
Feb. 12, 2019 (KR) .......... 10-2019-0016367

(51) Int. Cl.
*H04W 24/10* (2009.01)
*H04W 76/27* (2018.01)

(52) U.S. Cl.
CPC .......... *H04W 24/10* (2013.01); *H04W 76/27* (2018.02)

(58) Field of Classification Search
None
See application file for complete search history.

(56) References Cited

U.S. PATENT DOCUMENTS 9,609,538 B2    3/2017    Kim et al.
2019/0182682 A1    6/2019    Kim et al.
(Continued)

FOREIGN PATENT DOCUMENTS

EP    2 398 270 A2    12/2011
KR    10-2012-0135135 A    12/2012
KR    10-2018-0017909 A    2/2018

OTHER PUBLICATIONS

Intel; Stage 3 RRC TP on RRC Inactive state for E-UTRA connected to 5GC; 3GPP TSG-RAN2 Meeting #102; R2-1807362; May 21-25, 2018; Busan, Korea.
(Continued)

*Primary Examiner* — Scott M Sciacca
(74) *Attorney, Agent, or Firm* — Jefferson IP Law, LLP

(57) ABSTRACT

The present disclosure relates to a communication method and a system thereof which merge IoT technology with a 5G communication system for supporting a higher data transmission rate than 4G systems. The present disclosure can be applied to intelligent services (for example, smart homes, smart buildings, smart cities, smart cars or connected cars, healthcare, digital education, retail businesses, security and safety-related services, etc.) on the basis of 5G communication technology and IoT-related technology. The present disclosure relates to a method and device for collecting and reporting cell measurement information in a next generation communication system, and relates to an integrity protection method and device for supporting vehicle communication.

16 Claims, 22 Drawing Sheets

(56) References Cited

U.S. PATENT DOCUMENTS

| | | | |
|---|---|---|---|
| 2020/0145817 A1* | 5/2020 | Liu | H04W 12/04 |
| 2020/0329394 A1* | 10/2020 | Kimba Dit Adamou | H04W 24/10 |
| 2021/0068185 A1* | 3/2021 | Kimba Dit Adamou | H04W 24/02 |
| 2021/0105707 A1* | 4/2021 | Virtej | H04W 48/16 |

OTHER PUBLICATIONS

3GPP; 3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331; V15.1.0; Mar. 2018; Valbonne, France.

Samsung; Supporting MDT for RRC_Idle and RRC Inactive; 3GPP TSG-RAN WG2#106; R2-1907769 (Minor Update of R2-1905085; May 13-17, 2019; Reno, USA.

European Search Report dated Nov. 13, 2020; European Appln. No. 19802767.4-1212 / 3742791 PCT/KR2019005426.

Catt; RRC connection re-establishment and resume procedures in NR; 3GPP TSG-RAN WG2#101; R2-1801827; Resubmission of R2-1800132; Feb. 26-Mar. 2, 2018 ; Athens, Greece.

Vivo; RRC Connection Release Issues for UE in RRC Inactive; 3GPP TSG-RAN WG2 Meeting#101; R2-1802098; Resubmission of R2-1800877; Feb. 26-Mar. 2, 2018 ; Athens, Greece.

Vivo; Remaining FFS Issues on MSG3/4/5 Content for NR RRC Connection Control; 3GPP TSG-RAN WG2 Meeting #101; R2-1802087; Resubmission of R2-1800878; Feb. 26-Mar. 2, 2018 ; Athens, Greece.

Ericsson; NR RRC connection release and re-direct; 3GPP TSG-RAN WG2 #101; Tdoc R2-1802684; resubmission Tdoc R2-1801074; Feb. 26-Mar. 2, 2018 ; Athens, Greece.

3GPP; 3rd Generation Partnership Project; Technical Specification Group Radio Access Network; Evolved Universal Terrestrial Radio Access (E-UTRA); Medium Access Control (MAC) protocol specification (Release 16); 3GPP TS 36.321; V16.1.0; Jul. 2020; Valbonne, FR.

* cited by examiner

FIG. 2E
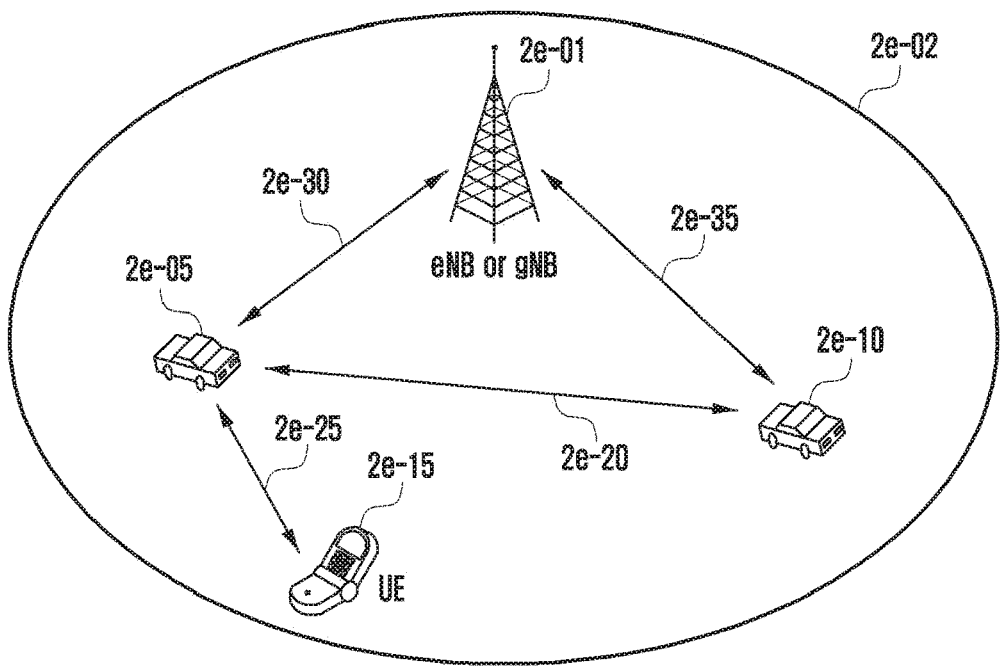
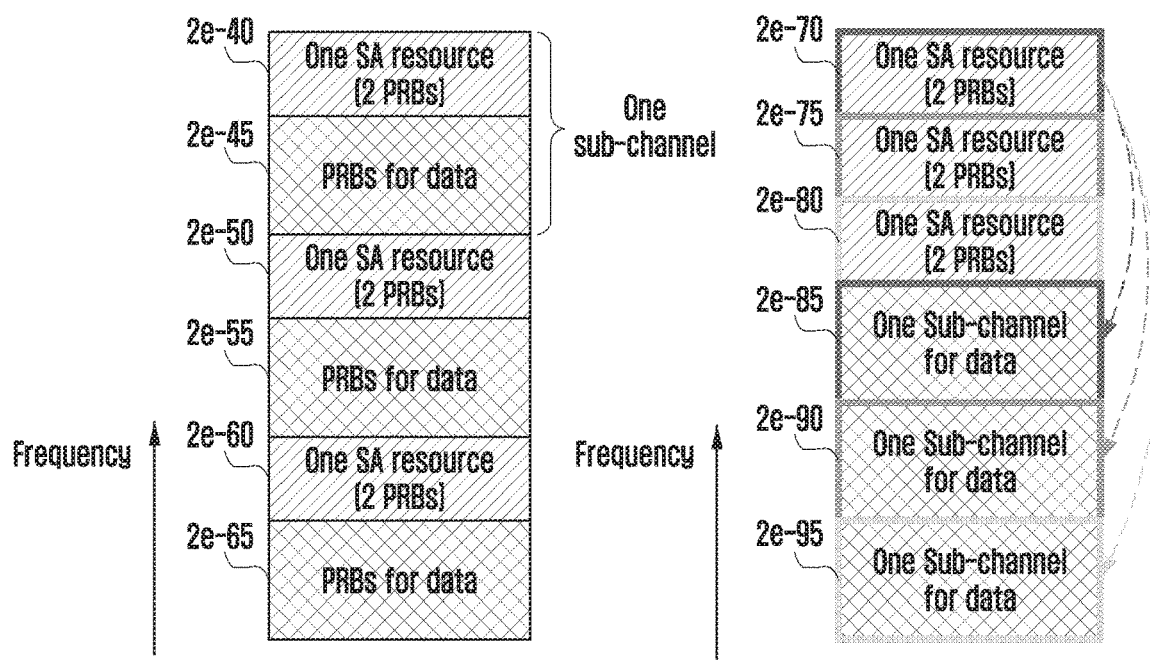

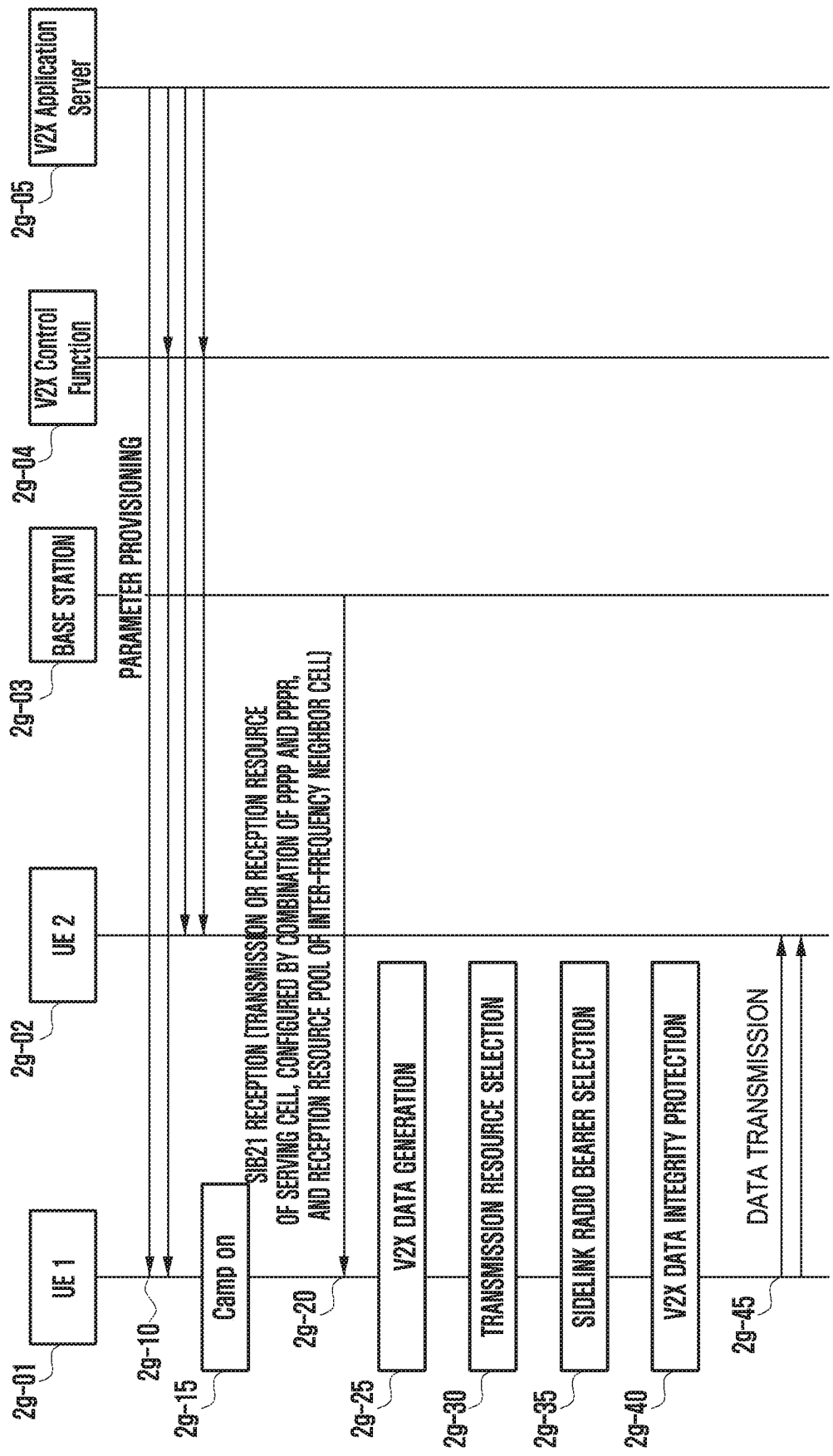

METHOD AND DEVICE FOR COLLECTING AND REPORTING CELL MEASUREMENT INFORMATION IN NEXT GENERATION MOBILE COMMUNICATION SYSTEM

TECHNICAL FIELD

The disclosure relates to a next-generation mobile communication system, and more particularly to a method and an apparatus for collecting and reporting cell measurement information by a terminal and a base station.

In addition, the disclosure relates to a method for selecting a sidelink radio bearer (SLRB) carrying V2X sidelink communication data by a terminal supporting V2X in order to support various vehicle-to-everything (hereinafter, referred to as "V2X") services in a next-generation mobile communication system, and to a method and apparatus for integrity protection of a V2X packet in a PDCP layer.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, as described above, as the communication system develops, there is a need to improve a process of collecting and reporting information relating to the result of cell measurement. In addition, there is a need for an efficient method to support the requirements and use cases for inter-vehicle communication services.

DISCLOSURE OF INVENTION

Technical Problem

Therefore, the disclosure aims to improve the process of collecting and reporting the result of cell measurement in a next-generation mobile communication system, thereby enabling efficient cell measurement to be performed.

In addition, in order to satisfy new V2X requirements and use cases in a next-generation mobile communication system, the disclosure defines Prose per-packet integrity (PPPI) to support integrity-protected V2X data and designs UE operation according thereto, thereby efficiently supporting various V2X services.

Solution to Problem

In order to solve the above problems, a method by a terminal according to an embodiment includes: transmitting, to a base station, a first message requesting radio resource control (RRC) resume; receiving, from the base station, a second message indicating the RRC resume; and transmitting, to the base station, a third message indicating an RRC resume complete, wherein the third message includes information indicating that a result of measurement which the terminal has performed in an RRC inactive state is stored.

In order to solve the above problems, a terminal according to another embodiment includes: a transceiver configured to transmit or receive a signal; and a controller configured to transmit, to a base station, a first message requesting radio resource control (RRC) resume, to receive, from the base station, a second message indicating the RRC resume, and to transmit, to the base station, a third message indicating an RRC resume complete, wherein the third message includes information indicating that a result of measurement which the terminal has performed in an RRC inactive state is stored.

In order to solve the above problems, a method by a base station according to still another embodiment includes: receiving, from a terminal, a first message requesting radio resource control (RRC) resume; transmitting, to the terminal, a second message indicating the RRC resume; and receiving, from the terminal, a third message indicating an RRC resume complete, wherein the third message includes information indicating that a result of measurement which the terminal has performed in an RRC inactive state is stored.

In order to solve the above problems, a base station according to yet another embodiment includes: a transceiver configured to transmit or receive a signal; and a controller configured to receive, from a terminal, a first message requesting radio resource control (RRC) resume, to transmit, to the terminal, a second message indicating the RRC resume, and to receive, from the terminal, a third message indicating an RRC resume complete, wherein the third message includes information indicating that a result of measurement which the terminal has performed in an RRC inactive state is stored.

In order to solve the above problems, a method by a terminal according to yet a further embodiment includes: receiving a V2X-related parameter from a network entity; generating a V2X data packet; determining a radio bearer for the V2X data packet based on the V2X-related parameter; performing integrity protection for the V2X data packet; and transmitting the V2X data packet for which the integrity protection is performed to a reception device.

In order to solve the above problems, a terminal according to still a further embodiment includes: a transceiver configured to transmit or receive a signal; and a controller configured to receive a V2X-related parameter from a network entity, to generate a V2X data packet, to determine a radio bearer for a V2X data packet based on the V2X-related parameter, to perform integrity protection for the V2X data packet, and to transmit the V2X data packet for which integrity protection is performed to a reception device.

Advantageous Effects of Invention

According to an embodiment of the disclosure, the procedure of collecting and reporting cell measurement information in a next-generation mobile communication system is improved, and thus efficient cell measurement can be performed.

According to another embodiment of the disclosure, PPPI may be defined in order to support various V2X services in a next-generation mobile communication system. Accordingly, the disclosure proposes a method for selecting a sidelink radio bearer (SLRB) carrying V2X sidelink communication data by a terminal supporting V2X based on PPPI, according to a V2X service and a transmission method, and a method for determining a PDCP PDU format, thereby performing efficient message transmission or reception.

BRIEF DESCRIPTION OF DRAWINGS

FIG. 2E illustrates V2X communication in a next-generation mobile communication system to which the present embodiment is applied;

FIG. 2G illustrates a data transmission procedure of a V2X UE operating in mode 4 when a resource pool for each service and a resource pool regardless of a service type coexist in a next-generation mobile communication system;

FIG. 2I illustrates a block configuration of a terminal according to the present embodiment.

MODE FOR THE INVENTION

Figure 1A:
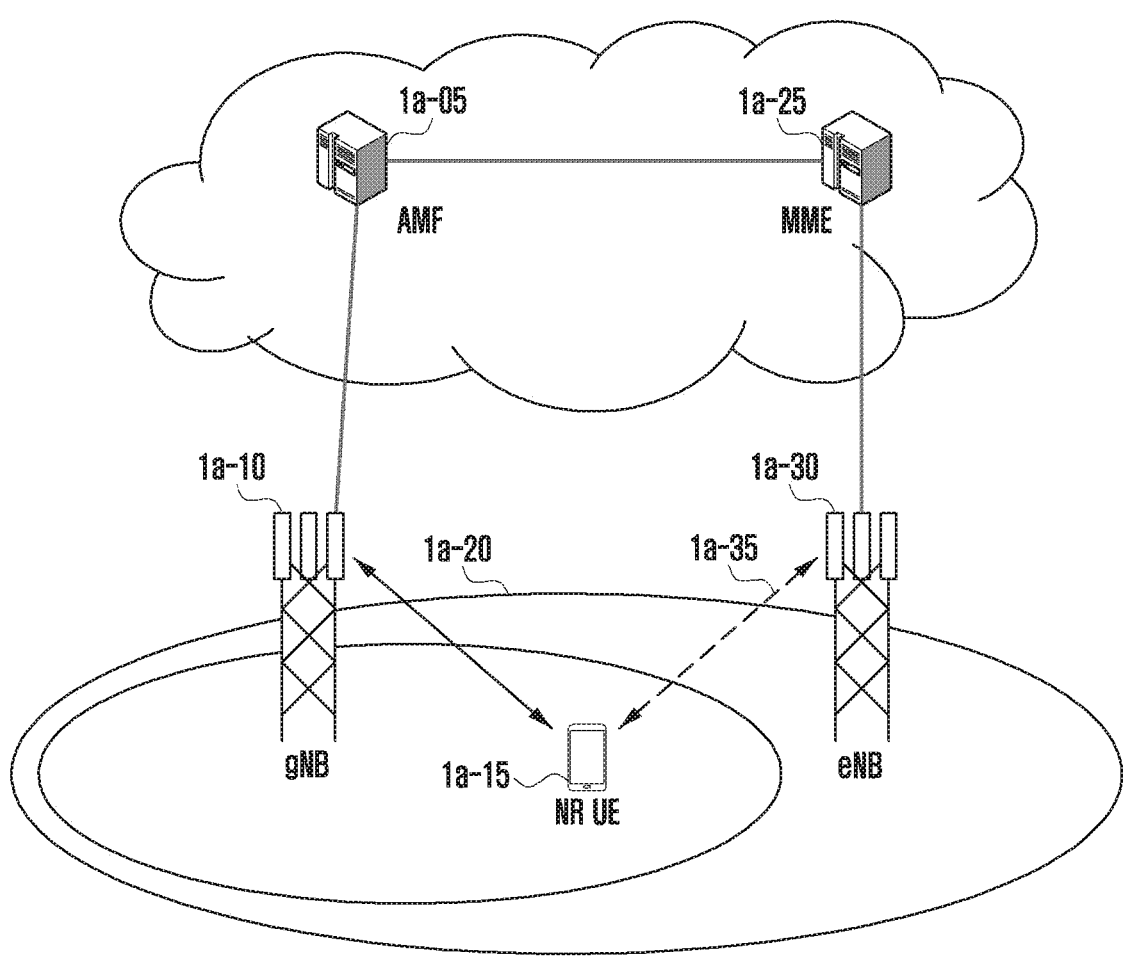
FIG. 1A illustrates the structure of a next-generation mobile communication system.

Hereinafter, exemplary embodiments of the disclosure will be described in detail with reference to the accompanying drawings. In the accompanying drawings, identical elements are provided with identical reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

First Embodiment

FIG. 1A illustrates the structure of a next-generation mobile communication system.

Referring to FIG. 1A, a radio access network of a next-generation mobile communication system (new radio (NR)) includes a next-generation base station (new radio node B, hereinafter gNB) 1a-10 and an AMF (new radio core network) 1a-05. A user equipment (new radio user equipment, hereinafter referred to as an NR UE or a terminal) 1a-15 accesses an external network through the gNB 1a-10 and the AMF 1a-05.

In FIG. 1A, gNB corresponds to an evolved node B (eNB) of an existing LTE system. The gNB is connected to the NR UE through a wireless channel, and can provide service superior to that of the existing node B (indicated by reference numeral 1a-20). In the next-generation mobile communication system, since all user traffic is serviced through a shared channel, a device for performing scheduling by collecting state information, such as buffer states, available transmission power states, and channel states of UEs, is required, and the gNB 1a-10 is in charge of this function of the device (indicated by reference numeral 1a-10). In general, one gNB controls a plurality of cells. In order to realize ultra-high-speed data transmission as compared to the existing LTE, the NR gNB may use the existing maximum bandwidth or more, and may additionally employ beam-forming technology using orthogonal frequency division multiplexing (OFDM) as a radio access technology. In addition, the NR gNB adopts an adaptive modulation & coding (hereinafter referred to as AMC) scheme that determines a modulation scheme and a channel coding rate based on the channel state of a UE. The AMF 1a-05 performs functions such as mobility support, bearer configuration, QoS configuration, and the like. The AMF is a device that is in charge of various control functions in addition to a mobility management function for a UE, and is connected to a plurality of base stations. In addition, the next-generation mobile communication system may also operate in conjunction with the existing LTE system, and the AMF is connected to an MME 1a-25 via a network interface. The MME is connected to an eNB 1a-30, that is, the existing base station. A UE supporting LTE-NR dual connectivity may transmit or receive data while maintaining a connection to the eNB as well as the gNB (indicated by reference numeral 1a-35).

Figure 1B:
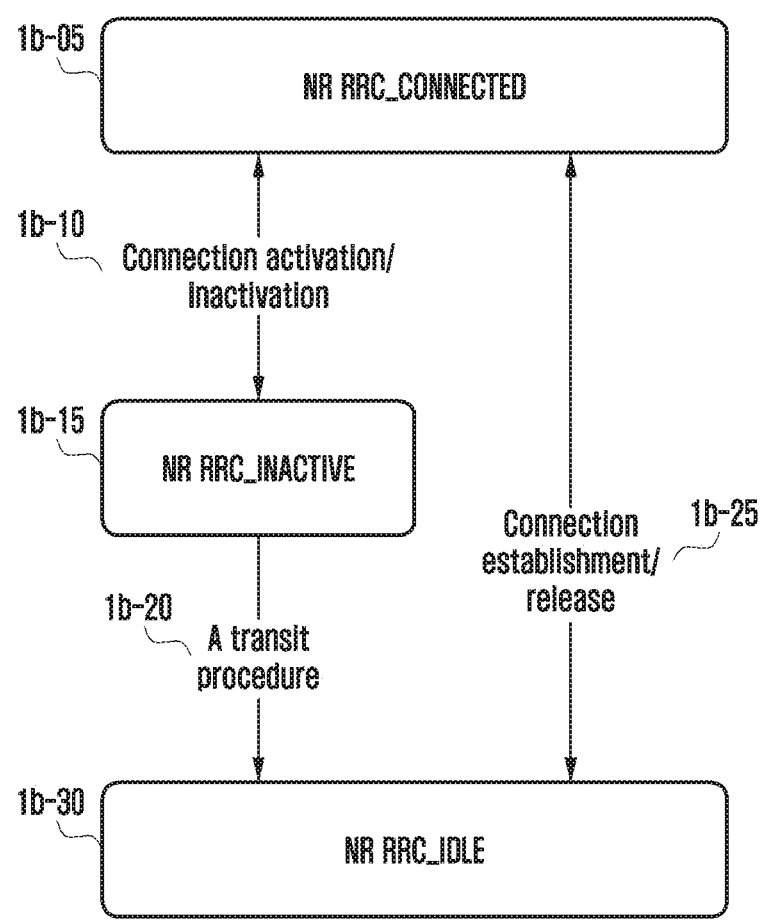
FIG. 1B illustrates radio access state transition in a next-generation mobile communication system.

FIG. 1B illustrates radio access state transition in a next-generation mobile communication system.

The next-generation mobile communication system includes three radio access states (RRC states). A connected mode (RRC_CONNECTED) 1b-05 is a radio access state in which a UE can transmit or receive data. An idle mode (RRC_IDLE) 1b-30 is a radio access state in which a UE monitors whether paging is transmitted to the UE itself. The two modes described above are radio access states that are also applied to the existing LTE system, and the detailed technology thereof is the same as that of the existing LTE system. In the next-generation mobile communication system, an inactive (RRC_INACTIVE) radio access state 1b-15 is newly defined. In the radio access state, a UE context is maintained at a base station and a UE, and RAN-based paging is supported. The characteristics of the new radio access state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area to which the UE belongs;

The new INACTIVE radio access state may switch to a connected mode or an idle mode by using a specific procedure. The INACTIVE radio access state is switched from an INACTIVE mode to a connected mode according to the connection activation, and is switched from the connected mode to the INACTIVE mode using the connection inactivation procedure (indicated by reference numeral 1b-10). According to the connection activation/inactivation procedure, one or more RRC messages are transmitted or received between a UE and a base station, and one or more operations are included in the procedure. It is also possible to switch from the INACTIVE mode to the idle mode according to a specific procedure (indicated by reference numeral 1b-20). As the specific procedure mentioned above, various methods based on, for example, a specific message exchange, timer, or event may be considered. Switching between the connected mode and the idle mode follows the existing LTE technology. That is, switching between the modes is performed through a connection establishment or release procedure (indicated by reference numeral 1b-25).

Figure 1C:
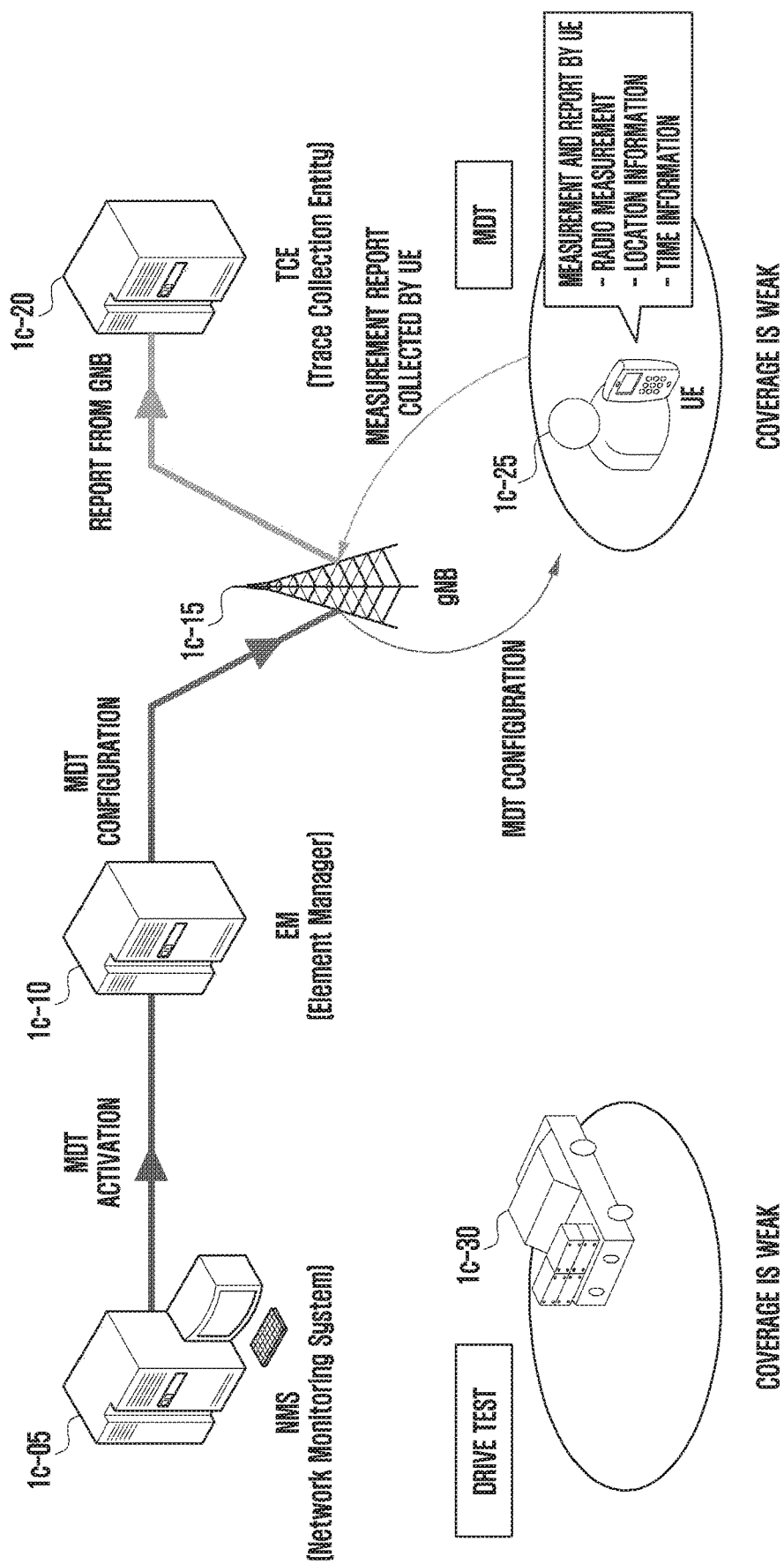
FIG. 1C illustrates a technology of collecting and reporting cell measurement information according to the current embodiment.

FIG. 1C illustrates a technology for collecting and reporting cell measurement information in the disclosure.

At the time of network establishment or network optimization, a mobile communication service provider usually measures a signal strength in an expected service area and, based on the measured signal strength, arranges or re-allocates base stations in the service area. The service provider collects cell measurement information in the service area by carrying signal measurement equipment around in a vehicle, which is time-consuming and expensive. The above process is generally referred to as a drive test because a vehicle is used in the process. In order to support operations such as cell reselection, handover, or serving-cell addition at the time of moving between cells, the UE is equipped with a function of measuring a signal transmitted to a base station. Therefore, instead of the drive test, a UE in the service area can be utilized, which is called minimization of drive test (MDT). The service provider may configure MDT operation for specific UEs through various network elements, and the UEs may collect and store signal strength information from a serving cell and neighboring cells in a connected mode (RRC_Connected), an idle mode (RRC_Idle), or an inactive mode (RRC_Inactive). In addition, the UEs store various information such as location information, time information, and signal quality information. The stored information can be reported to the network when the UEs are in a connected mode, and the information is transferred to a specific server.

The MDT operation is broadly classified into immediate MDT and logged MDT.

According to the immediate MDT, the collected information is immediately reported to the network. Since the collected information needs to be reported immediately, only a UE in the connected mode can perform the immediate MDT. Typically, an RRM measurement process for supporting operations such as handover and serving-cell addition, is reused, and location information, time information, etc. are additionally reported.

According to the logged MDT, the collected information is stored without being immediately reported to a network, and the stored information is reported to the network after the UE switches to the connected mode. The logged MDT operation is normally performed by a UE that is in an idle mode and thus cannot immediately report to the network. In the disclosure, a UE, which is in an inactive mode, introduced in a next-generation mobile communication system performs the logged MDT operation. When a specific UE is in a connected mode, the network provides, to the UE, configuration information for performing a logged MDT operation, and the UE collects and stores the configuration information after switching to the idle mode or the inactive mode.

The MDT operation is summarized in Table 1 below.

TABLE 1

| | RRC state |
|---|---|
| Immediate MDT | RRC_Connected |
| Logged MDT | RRC_Idle, RRC_Inactive |

Figure 1D:
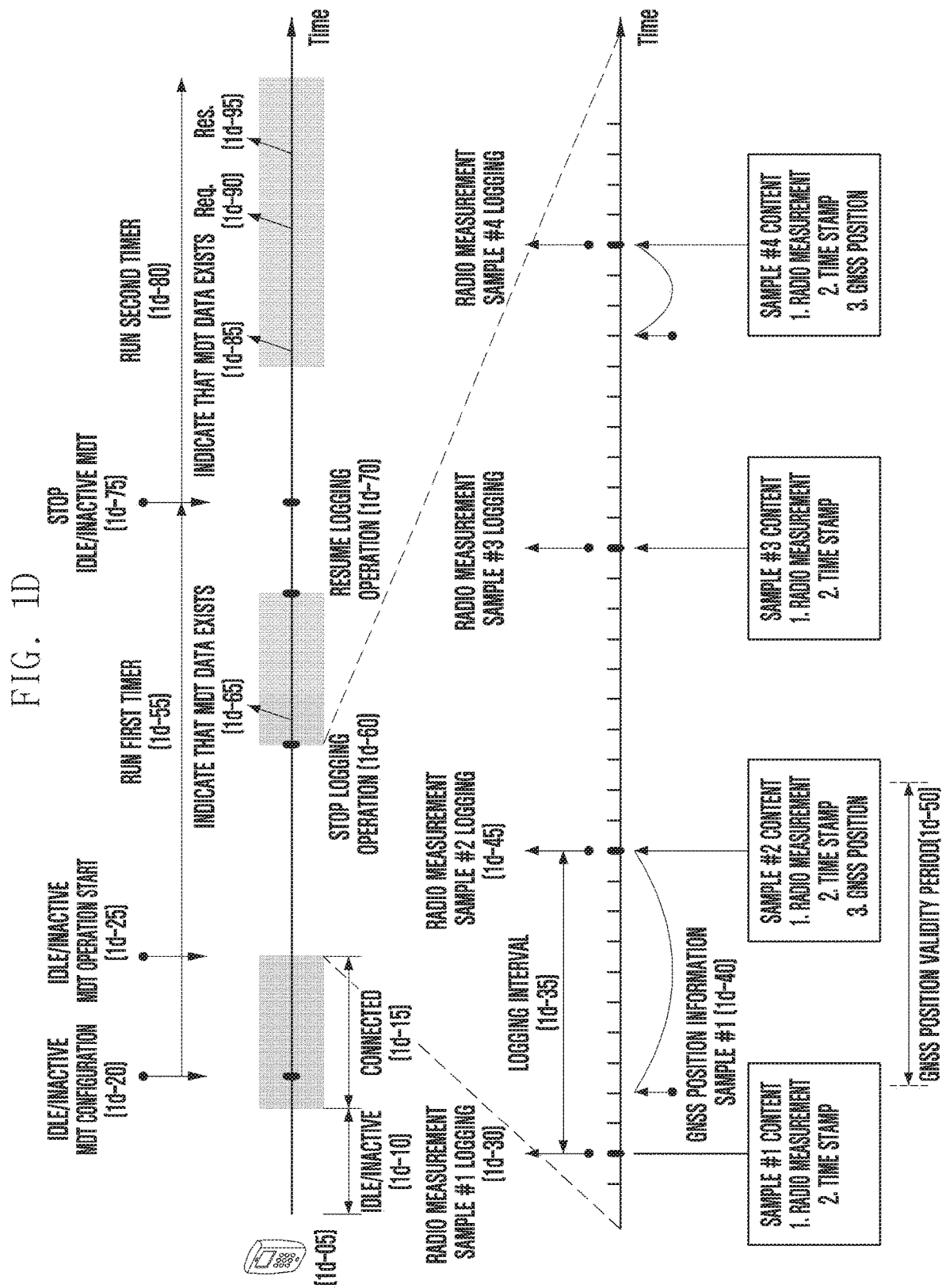
FIG. 1D illustrates a method of collecting and reporting cell measurement information according to the present embodiment.

FIG. 1D illustrates a method of collecting and reporting cell measurement information in the disclosure.

The UE 1d-05 switches from the idle mode or the inactive mode 1d-10 to the connected mode 1d-15. In the connected mode, the UE collects MDT data and reports the collected MDT data to a base station through the immediate MDT operation. The UE, which is switched to the connected mode, receives logged MDT configuration information performed in the idle mode or the inactive mode from the base station (indicated by reference numeral 1d-20). The configuration information, which includes a predetermined RRC message, is transmitted to the UE, and the UE, having received the message, runs a first timer (indicated by reference numeral 1d-55). The UE performs the logged MDT operation in an idle mode or an inactive mode period until the first timer expires. The value of the first timer is included in the logged MDT configuration information. If the UE switches to the idle mode or the inactive mode, the logged MDT is performed according to the received configuration information (indicated by reference numeral 1d-25). The UE stores predetermined information collected every configured period and every logging interval 1d-35 (indicated by reference numerals 1d-30 and 1d-45). In addition, if valid location information 1d-40 is collected, the UE needs to store the location information. The location information is determined to be valid if a predetermined time 1d-50 has not passed since the information was collected. The predetermined time is equal to or shorter than the logged interval. Even before the first timer has yet expired, the UE temporarily stops the logged MDT operation that is being performed at the time of switching to the connected mode (indicated by reference numeral 1d-60). However, the first timer does not stop running but continues to run even in the connected mode section. That is, the first timer continues to run regardless of the RRC state change. However, when MDT data is not stored any longer because there is insufficient UE memory to store the MDT data, or when the logged MDT configuration information is released, the first timer is stopped. The logged MDT configuration information is released in the case in which other logged MDT configuration information is provided in a serving RAT or another RAT or in the case in which the UE is detached or power is disconnected. The UE reports to the base station that the UE itself includes the stored collected information (MDT data) using a predetermined RRC message during a connection establishment process (RRC Connection Establishment) or a connection resume process (RRC Connection Resume) (indicated by reference numeral 1d-65). The connection resume process is a process in which the UE switches from the inactive mode to the connected mode. The connection resume process includes three steps as follows, and three types of RRC messages are used in the process.

step 1: a UE transmits an RRC resume request message to a base station step 2: a base station transmits an RRC resume message to a UE step 3: a UE transmits an RRC resume complete message to a base station The connection resume process may include two steps depending on the objective of the resume. For example, a resume process for RNA update may include:

step 1: a UE transmits an RRC resume request message to a base station step 2: a base station transmits an RRC resume message to the UE A detailed description will be made later. The UE reports information indicating that the UE includes the collected information to a target base station not only during the connection establishment process or the connection resume process, but also during a connection reestablishment process (RRC Connection Reestablishment) and a handover process. If the logged MDT is configured but there is no collected and stored information yet, the UE omits the report. Upon receipt of the report, the base station may request a report of MDT data stored in the UE as needed. MDT data that has not been reported needs to be stored in the UE for a predetermined time. If the UE is switched back to the idle mode or the inactive mode and the first timer has not yet expired, the logged MDT operation is resumed (indicated by reference numeral 1d-70). If the first timer expires, the logged MDT operation is stopped (indicated by reference numeral 1d-75). The UE, having stopped the operation, runs a second timer (indicated by reference numeral 1d-80) and maintains the MDT data stored until the second timer expires. After the second timer expires, whether to delete the stored MDT data is determined by the UE implementation. The value of the second timer is not included in or configured for the logged MDT configuration information, and a predefined value is applied. When the UE is switched back to the connected mode, the UE reports to the base station that the UE itself includes the stored collected information (MDT data) (indicated by reference numeral 1d-85). In this case, the base station requests a report of MDT data, which is being stored by the UE, using a predetermined RRC message (indicated by reference numeral 1d-90). Accordingly, the UE includes the MDT data, which is being stored, in a predetermined RRC message and reports the message to the base station (indicated by reference numeral 1d-95).

Figure 1E:
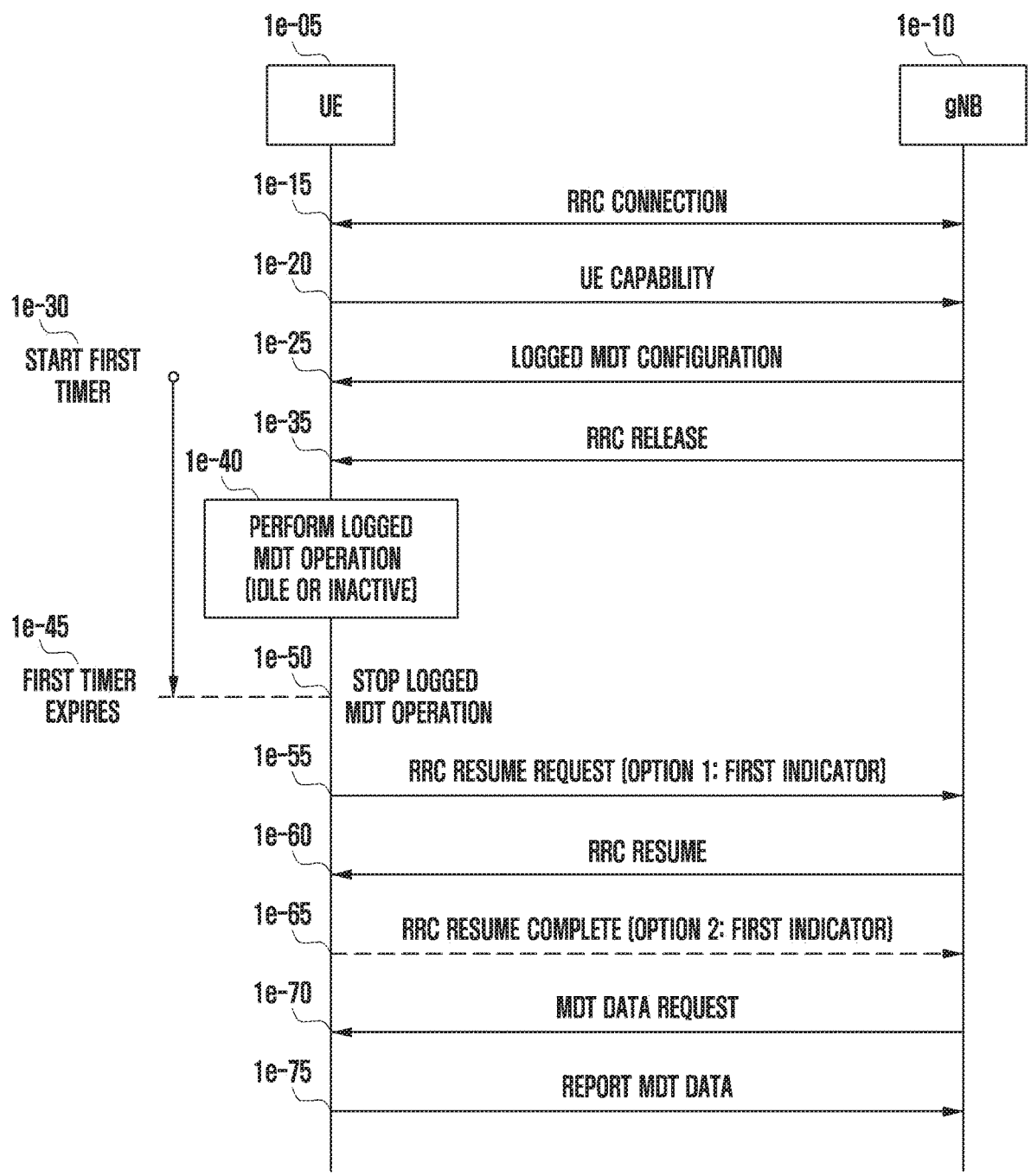
FIG. 1E is a flowchart illustrating an operation of collecting and reporting cell measurement information according to the present embodiment.

FIG. 1E is a flowchart illustrating the operation of collecting and reporting cell measurement information in the disclosure.

A UE 1e-05 establishes a connection with a base station 1e-10 (indicated by reference numeral 1e-15). The UE may provide UE capability information to the base station (indicated by reference numeral 1e-20), and may indicate whether the UE itself supports MDT operation and a frequency that can be measured. The base station stores, in a predetermined RRC message, configuration information required to perform the logged MDT operation, and transmits the RRC message to the UE (indicated by reference numeral 1e-25). In one example, the configuration information includes at least one of the following pieces of information.

Trace Reference information

Trace Recording Session Reference Information

Information on a trace collection entity (TCE) ID: a base station transmits MDT data information, reported from a UE, to a data server designated by the TCE ID.

Absolute Time information: the absolute time in the cell that currently provides logged MDT configuration information Area Configuration: area information capable of collecting and storing measurement information through the logged MDT operation, indicated in units of cells. In addition, the area configuration may include RAT information indicating collection of measurement information. A list included in the RAT information is a blacklist or a whitelist. If the list is a blacklist, cell measurement information is collected for RATs that are not included in the list. If the list is a whitelist, cell measurement information is not collected for RATs that are not included in the list.

Logging Duration: the value of the first timer, and when the first timer is running, a logged MDT operation is performed in an idle mode or an inactive mode Logging Interval: the period at which the collected information is stored.

plmn-IdentityList: PLMN list information, and plmn-IdentityList receives PLMN information capable of reporting whether to store MDT data and reporting the MDT data, as well as performing the logged MDT operation.

An indicator indicating whether the logged MDT operation is performed in an idle mode, an inactive mode, or both modes. The RRC state for performing the logged MDT operation may be indicated using the indicator, or it may be defined that the logged MDT operation is always performed in the idle mode and the inactive mode without the indicator. The UE performs the logged MDT operation only in the RRC state indicated by the indicator.

An indicator indicating whether to collect and store beam-level measurement information. In the next-generation mobile communication system, a beam antenna can be applied. Without the indicator, it may be defined that beam-level measurement is always collected and stored for the frequency in which a beam-based operation is performed.

Information on the maximum number of beams that is collected or stored, and information on the minimum signal strength of stored beams. The UE omits storage of information of a beam, the signal strength of which is weaker than the minimum signal strength. If all of the beams are weaker than the configured minimum signal value, the UE may store information of the single beam having the strongest signal strength, or may include an indicator indicating that all of the beams are weaker than the configured minimum signal value.

An indicator indicating whether an MDT retrieval operation can be triggered in two step resume process (RRC resume).

Upon receiving the logged MDT configuration information, the UE runs the first timer (indicated by reference numeral 1e-30). The value of the first timer is configured as equal to the value of the logging duration. The base station switches the UE to an idle mode or an inactive mode through the RRC release message (indicated by reference numeral 1e-35). Depending on the RRC state to which the UE is switched, the RRC Release message includes configuration information for operation in the RRC state. If the first timer is running, the UE performs the logged MDT in an idle mode or an inactive mode (indicated by reference numeral 1e-40). The UE measures the signal strengths of a serving cell and neighboring cells, and acquires location information thereof. If beam-level measurement is configured, the signal strength values for beams having a value larger than the configured minimum value are collected and stored in a serving cell and an adjacent cell. The maximum number of beams that can be stored is configured or predefined. The signal strength denotes RSRP, RSRQ, or SINR. The collected information is stored for each logging interval period. Each piece of log information stored for each period includes an indicator indicating whether the stored information is collected in the idle mode or in the inactive mode. Alternatively, the indicator may be included for each first log in which the mode is switched. Accordingly, signaling overhead due to the indicator can be minimized. When the first timer expires (indicated by reference numeral 1e-45), the logged MDT operation is stopped (indicated by reference numeral 1e-50).

In the case in which the UE enters the inactive mode through the RRC Release message and receives RAN or CN paging from a base station, or in the case in which MO data transmission is activated, the UE initializes a resume process for switching from the inactive mode to the connected mode. In the disclosure, the UE includes, in the RRC resume request or RRC resume complete message, a first indicator indicating whether there is MDT data stored by the UE itself. For example, when the resume process is triggered for RNA update and is configured to include two steps, the first indicator is included in the RRC resume request message. Otherwise, if the resume process is intended to switch to the connected mode for data transmission, the process is configured to include three steps, and the first indicator is included in the RRC resume complete message. In response to the RRC resume request message, the base station transmits an RRC resume message to the UE. If the RRC resume request message includes the first indicator (indicated by reference numeral 1e-55), and if the base station wants to receive reporting of the MDT data, the base station includes an indicator requesting reporting of the MDT data in the RRC resume message 1e-60. Alternatively, in the case of two step resume process, the base station includes an indicator indicating that the UE needs to switch to a connected mode. Further, the base station stores configuration information required for switching to the connected mode in the RRC resume message. The UE, having received the indicator, switches to the three step resume process even if the RRC resume request message is triggered through the two step resume process in order to switch to the connected mode. In the case of a three step resume process, the first indicator is stored in the RRC resume complete message (indicated by reference numeral 1e-65). After reception of the RRC resume complete message, the base station requests the UE to report MDT data using a predetermined RRC message (indicated by reference numeral 1e-70). Accordingly, the UE reports the stored MDT data to the base station using the predetermined RRC message (indicated by reference numeral 1e-75).

In the case in which the UE enters the idle mode through the RRC Release message and receives CN paging from the base station or, in the case in which MO data transmission is activated, the UE initializes the establishment process for switching from the idle mode to the connected mode. The establishment process includes:

Step 1: a UE transmits an RRC connection request message to a base station

Step 2: a base station transmits an RRC setup message to a UE

Step 3: a UE transmits an RRC setup complete message to the base station

The UE includes an indicator indicating that MDT data, stored by the UE itself, is included in the RRC Setup Complete message. Upon receiving the RRC Setup Complete message, the base station requests reporting of the MDT data, as needed, using a predetermined RRC message. Upon receiving the request, the UE reports the MDT data using the predetermined RRC message.

According to the (1-1)th embodiment of the disclosure, the first indicator may be included in the two- or three step resume process. If the first indicator is stored in the resume request message in the two step resume process, the two step resume process is switched to the three step resume process, in order to perform MDT retrieval, according to the determination of the base station. According to the (1-2)th embodiment, the first indicator is included only in the three step resume process. That is, according to the (1-2)th embodiment, in the two step resume process, the first indicator may not be included in the RRC resume request message, and may be included only in the RRC resume complete message. Therefore, for the RNA update, if the two step resume process is triggered, the UE cannot perform MDT retrieval. According to the (1-3)th embodiment, a method for, when a resume process has failed, subsequently reporting failure of the resume process is proposed.

Figure 1F:
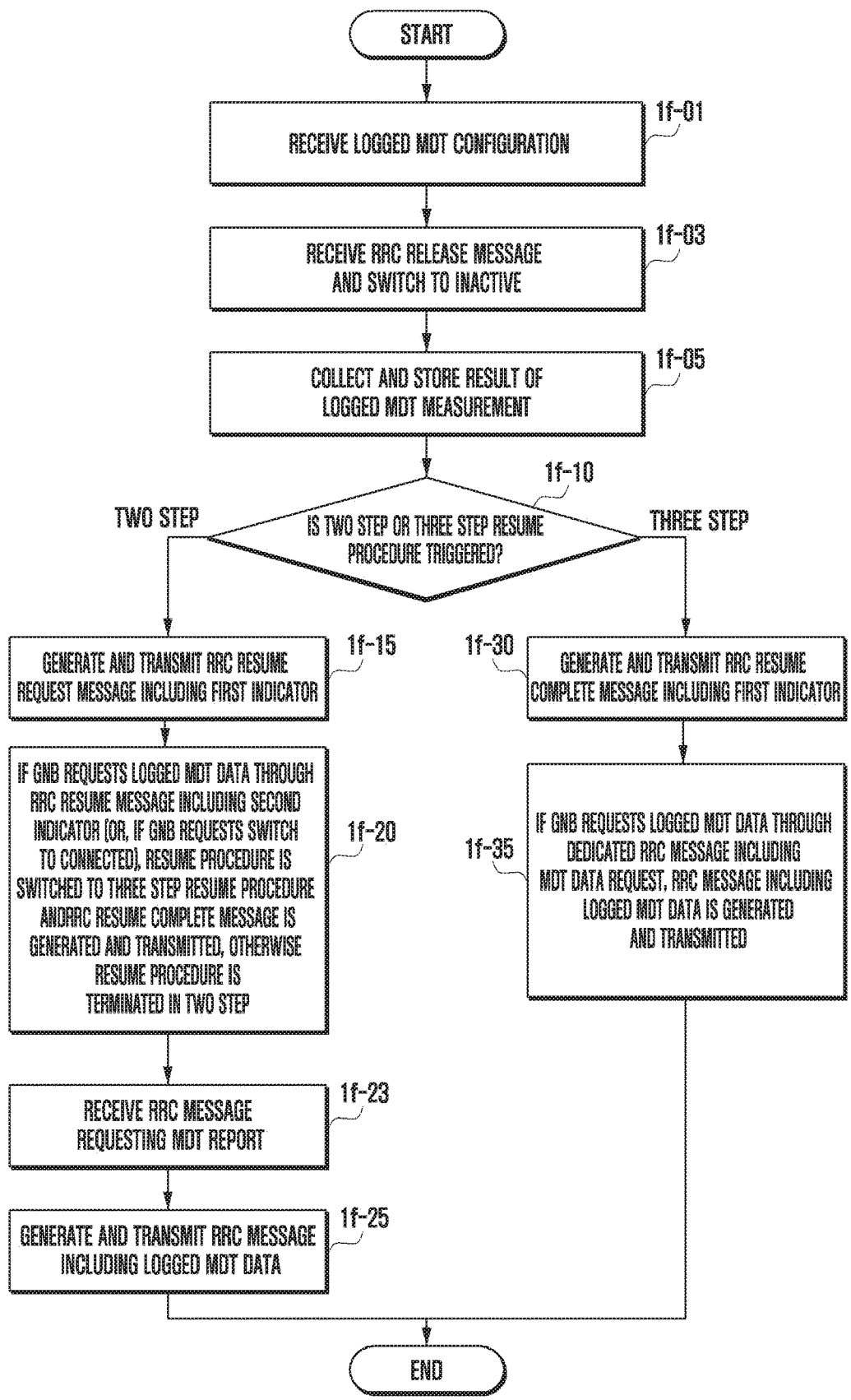
FIG. 1F is a flowchart illustrating a UE operation of collecting and reporting cell measurement information according to a (1-1)th embodiment.

FIG. 1F is a flowchart illustrating a UE operation of collecting and reporting cell measurement information according to the (1-1)th embodiment.

In operation 1f-01, a UE receives logged MDT configuration information from a base station. The configuration information includes information required to perform a logged MDT operation in an idle mode or an inactive mode.

In operation 1f-03, the UE receives the RRC Release message from the base station and switches to an inactive mode.

In operation 1f-05, the UE collects and stores cell measurement information and other additional information according to the logged MDT configuration information.

In operation 1f-10, the UE triggers a two or three step resume process. The two step resume process is triggered mainly during RNA update. At this time, the UE normally receives the resume message from the base station, and then switches back to the inactive mode. The three step resume process is triggered at the time of switching to the connected mode, mainly for data transmission.

In operation 1f-15, in the case of the two step resume process, the UE includes, in the RRC resume request message, an indicator indicating that the UE itself includes MDT data. Then, the UE transmits the message to the base station.

In operation 1f-20, the UE receives an RRC resume message including an indicator requesting reporting of MDT data from the base station or an indicator indicating to switch to a connected mode. In the disclosure, even if the two step resume process is triggered for RNA update, when the base station makes a request, it is characterized in that the two step resume process is switched to the three step resume process. If the indicator is not included in the message, the two step resume process is ended.

In operation 1f-23, the UE receives a predetermined RRC message requesting reporting of MDT data from the base station.

In operation 1*f*-25, the UE reports a predetermined RRC message including MDT data to the base station.

In operation 1*f*-30, in the case of a three step resume process, the UE includes, in the RRC resume complete message, an indicator indicating that the UE itself includes MDT data. Then, the UE transmits the message to the base station.

In operation 1*f*-35, if the UE receives a predetermined RRC message requesting reporting of MDT data from the base station, in response thereto, the UE reports a predetermined RRC message including the MDT data to the base station.

As an alternative, in operation 1*f*-20, if the UE receives an RRC resume message including an indicator requesting reporting of MDT data from the base station, the UE includes the MDT data, which is being stored, in the RRC resume complete message, and report the message to the base station.

Figure 1G:
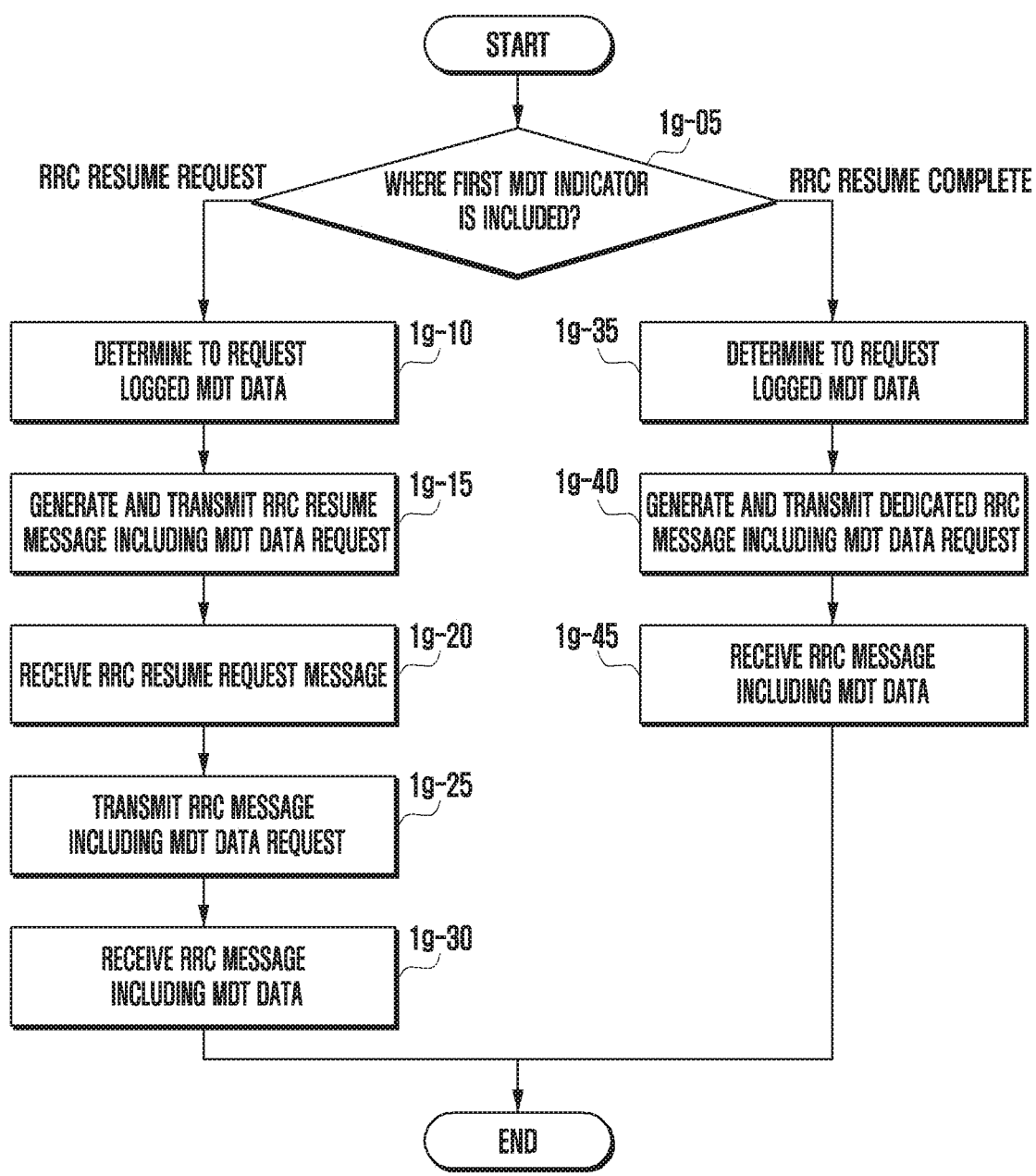
FIG. 1G is a flowchart illustrating a base station operation of collecting and reporting cell measurement information according to a (1-1)th embodiment.

FIG. 1G is a flowchart illustrating a base station operation of collecting and reporting cell measurement information according to the (1-1)th embodiment.

In operation 1*g*-05, a base station determines an RRC message, which includes a first indicator received from a specific UE.

In operation 1*g*-10, if the RRC message including the first indicator is an RRC resume request message, the base station determines whether to request MDT data from the UE.

In operation 1*g*-15, the base station stores, in an RRC resume message, an indicator requesting MDT report or an indicator indicating to switch to a connected mode, and then transmits the message to the UE.

In operation 1*g*-20, the base station receives an RRC resume request message from the UE.

In operation 1*g*-25, the base station transmits a predetermined RRC message requesting reporting of MDT data to the UE.

In operation 1*g*-30, the base station receives a predetermined RRC message including MDT data from the UE.

In operation 1*g*-35, if the RRC message including the first indicator is an RRC resume request message, the base station determines whether to request MDT data from the UE.

In operation 1*g*-40, the base station transmits a predetermined RRC message requesting reporting of MDT data to the UE.

In operation 1*g*-45, the base station receives a predetermined RRC message including MDT data from the UE.

Figure 1H:
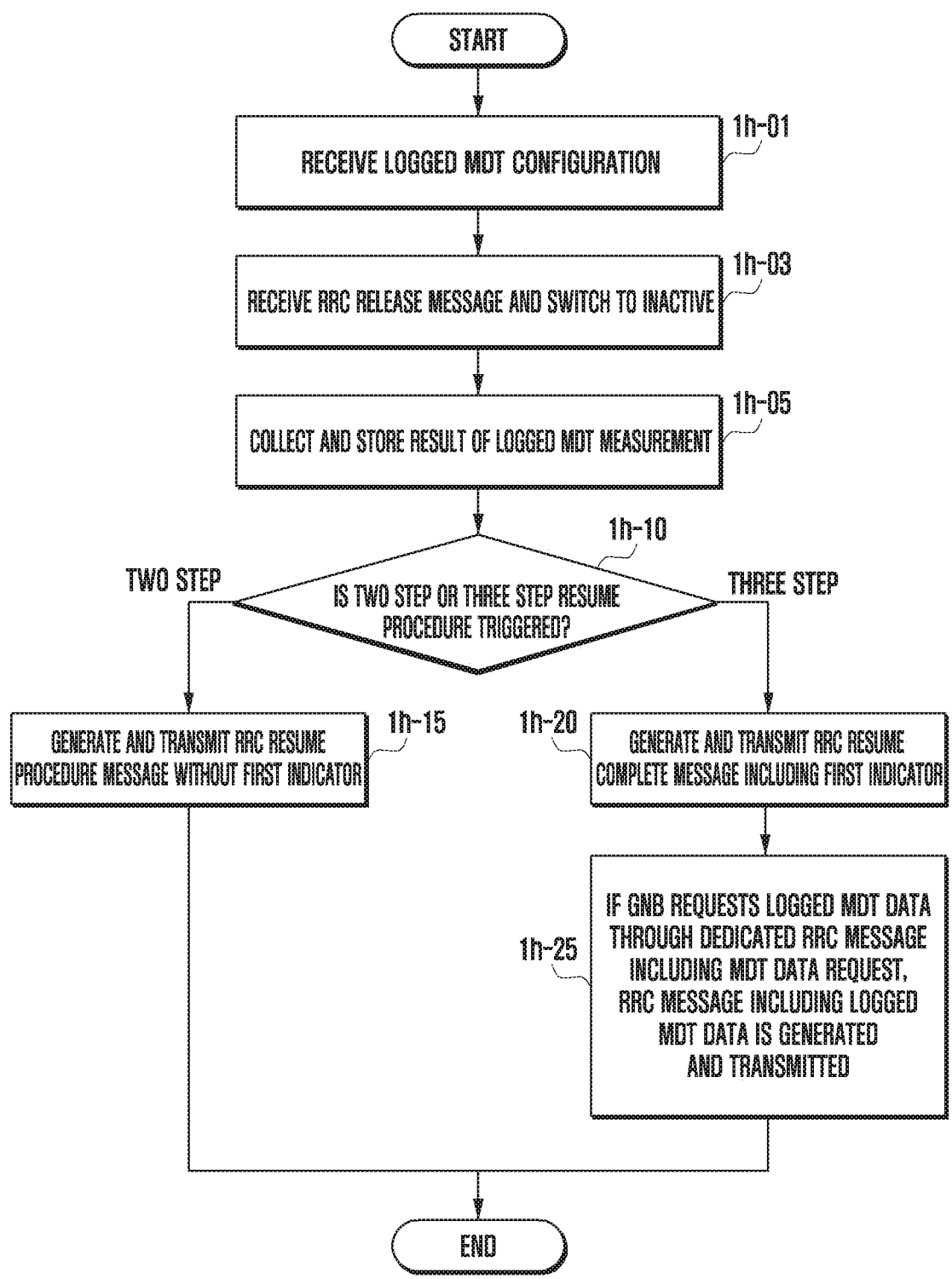
FIG. 1H is a flowchart illustrating a UE operation of collecting and reporting cell measurement information according to a (1-2)th embodiment.

FIG. 1H is a flowchart illustrating a UE operation of collecting and reporting cell measurement information according to the (1-2)th embodiment.

In operation 1*h*-01, a UE receives logged MDT configuration information from a base station. The configuration information includes information required to perform a logged MDT operation in an idle mode or an inactive mode.

In operation 1*h*-03, the UE receives the RRC Release message from the base station and switches to the inactive mode.

In operation 1*h*-05, the UE collects and stores cell measurement information and other additional information according to the logged MDT configuration information.

In operation 1*h*-10, the UE triggers a two step or three step resume process.

In operation 1*h*-15, if the two step resume process is triggered, the UE generates an RRC resume request message without the first indicator and transmits the message to a serving base station. That is, MDT retrieval is excluded in the two step resume process.

In operation 1*h*-20, if the three step resume process is triggered, the UE includes, in the RRC resume complete message, an indicator indicating that the UE itself includes the MDT data. Then, the UE transmits the message to the base station.

In operation 1*h*-25, if the UE receives a predetermined RRC message requesting reporting of MDT data from the base station, in response thereto, the UE reports a predetermined RRC message including MDT data to the base station.

Figure 1I:
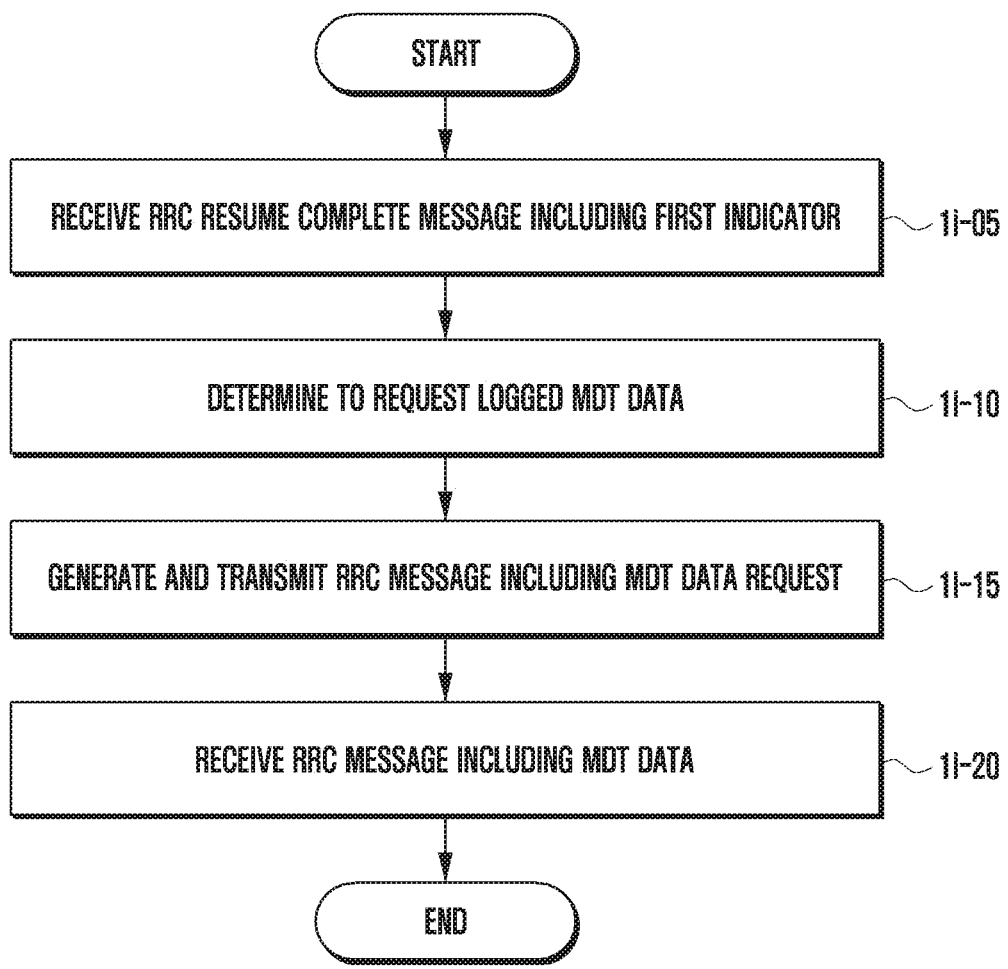
FIG. 1I is a flowchart illustrating a base station operation of collecting and reporting cell measurement information according to a (1-2)th embodiment.

FIG. 1I is a flowchart illustrating a base station operation of collecting and reporting cell measurement information according to the (1-2)th embodiment.

In operation 1*i*-05, a base station receives an RRC resume complete message including a first indicator from a specific UE.

In operation 1*i*-10, the base station determines whether to request MDT data from the UE.

In operation 1*i*-15, the base station transmits a predetermined RRC message requesting reporting of MDT data to the UE.

In operation 1*i*-20, the base station receives a predetermined RRC message including MDT data from the UE.

Figure 1J:
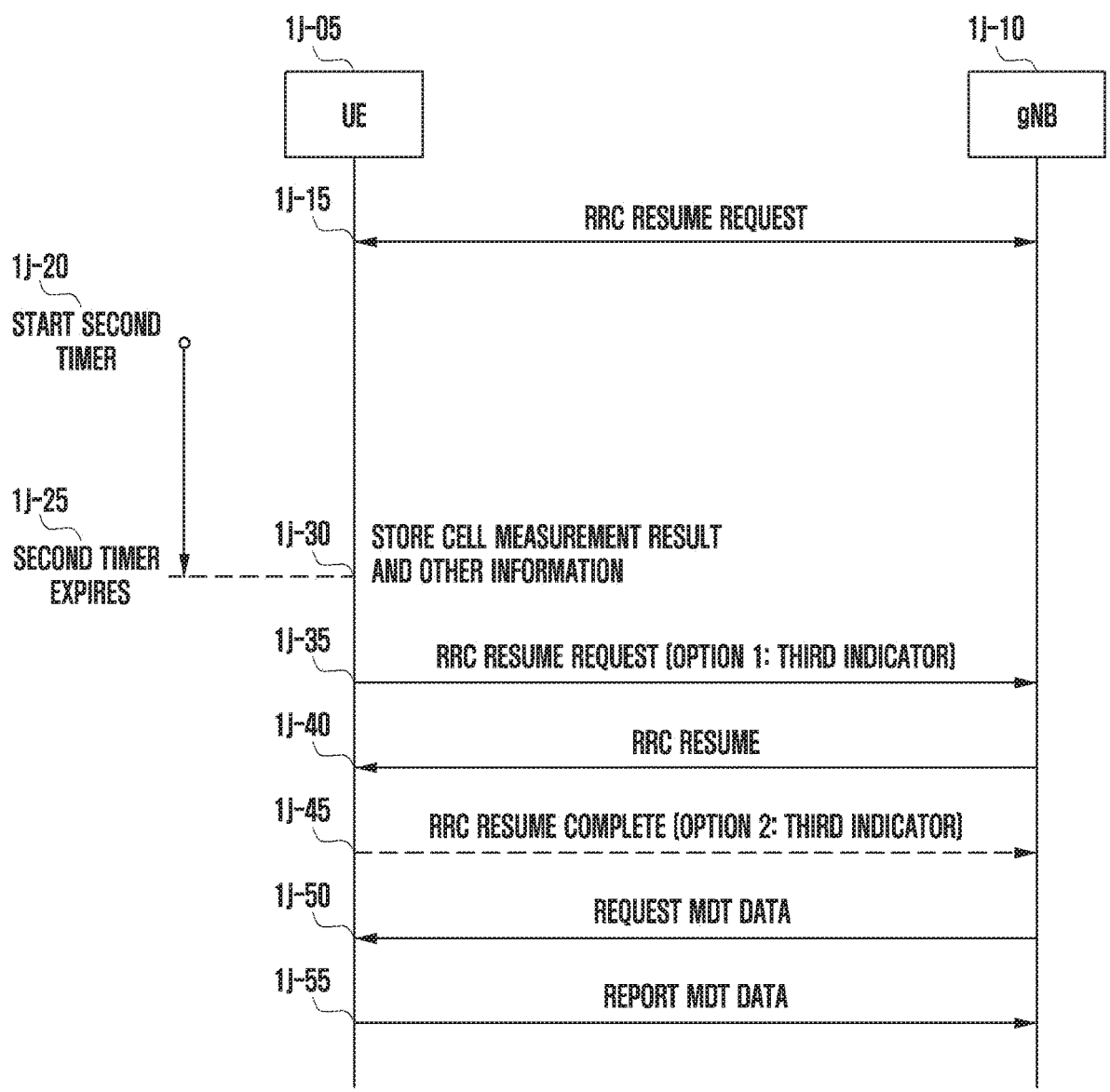
FIG. 1J is a flowchart illustrating an operation of collecting and reporting cell measurement information according to a (1-3)th embodiment.

FIG. 1J is a flowchart illustrating an operation of collecting and reporting cell measurement information according to the (1-3)th embodiment.

A UE reports capability information relating to whether the UE itself supports resume failure logging and reporting to the base station by using a predetermined RRC message.

The base station indicates resume failure logging to a UE in a connected mode using a predetermined RRC message. The configuration information may be included in an RRCRelease message including suspend configuration. Alternatively, the configuration information may be included in a predetermined RRC message such as RRCConfiguration. If the resume process is subsequently not successfully completed, the UE, for which the resume failure logging is configured, stores information useful for coverage optimization, such as cell measurement information, at that time.

As another option, a UE supporting the operation described above may always perform the operation when the resume process fails.

A UE 1*j*-05 in an inactive mode may be switched to a connected mode, or may trigger a resume process in order to perform RNA update. The UE initiates the resume process by transmitting an RRC resume request message to a base station 1*j*-10. While transmitting the RRC resume request message (indicated by reference numeral 1*j*-15), the UE starts a second timer (indicated by reference numeral 1*j*-20). The second timer stops when an RRC resume message is received from the base station or when cell reselection is performed. If the RRC resume message is not received from the base station until the second timer expires (indicated by reference numeral 1*j*-25), the UE considers that the triggered resume process has failed. At this time, the UE stores the collected cell measurement information and other additional information (indicated by reference numeral 1*j*-30). The information includes at least one of the following pieces of information listed below.

An indicator indicating whether the expired second timer was started by the establishment process or by the resume process.

A cause value of the resume process in which the resume failure is detected. For example, the cause value may include RNA update, MO-signaling, MO-data, mt-Access, emergency, highPriorityAccess, delayTolerantAcess, mo-VoiceCall, etc.

CGI information (global cell ID) or PCI information (physical cell ID) of a cell in which the resume failed is detected.

Signal strength and information of RSRP, RSRQ, and SINR of a cell in which the resume failure is detected and neighboring cells thereof.

If the cells support beam operation, beam-level signal strength and information of RSRP, RSRQ, and SINR of a cell in which the resume failure is detected and neighboring cells thereof.

Location information of valid UE

Speed information of valid UE

Information on the number of times of transmissions of a preamble by the MAC layer in random access triggered for the resume process An indicator indicating whether unsuccessful contention resolution has occurred for a preamble transmitted at least once in random access triggered for the resume process An indicator indicating whether the UE transmission power used in the last transmission preamble in the random access triggered for the resume process has reached the maximum UE power An indicator indicating whether random access triggered for the resume process is performed in a normal uplink (NUL) or a supplementary uplink (SUL) (the indicator is also included in the establishment failure report)

After a predetermined time has passed, the UE again attempts a resume process for switching from an inactive mode to a connected mode. The UE includes, in the RRC resume request or RRC resume complete message, a third indicator indicating whether there is establishment/resume failure information stored by the UE itself. The third indicator is indicated separately from the first indicator. Separate indicators may be defined to indicate whether there is establishment failure and resume failure information. When the resume process is triggered for RNA update and is configured to include two steps, the third indicator is included in the RRC resume request message. Otherwise, if the resume process is intended to switch to the connected mode for data transmission, the process is configured to include three steps, and the third indicator is included in the RRC resume complete message. In response to the RRC resume request message, the base station transmits an RRC resume message to the UE. If the third indicator is included in the RRC resume request message (indicated by reference numeral 1$j$-35) and the base station wants to receive a report including the establishment failure and resume failure information, the base station includes, in the RRC resume message 1$j$-40, an indicator requesting the reporting of the establishment failure and resume failure information, or, in the case of a two step resume, the base station includes, in the RRC resume message, an indicator indicating to switch the UE to the connected mode. In addition, the base station includes, in the RRC resume message, configuration information required for switching to the connected mode. The UE, having received the indicator, switches to the three step resume process, even if the RRC resume request message is triggered through the two step resume process, in order to switch to the connected mode. In the case of a three step resume process, the first indicator is stored in the RRC resume complete message (indicated by reference numeral 1$j$-45). After receiving the RRC resume complete message, the base station requests the UE to report the establishment failure and resume failure information using a predetermined RRC message (indicated by reference numeral 1$j$-50). Accordingly, the UE reports the stored establishment failure and resume failure information to the base station using the predetermined RRC message (indicated by reference numeral 1$j$-55).

Alternatively, according to the (1-2)th embodiment, retrieval of the establishment failure and resume failure information may not be allowed in the two step resume process.

Retrieval of the establishment failure and resume failure information is also possible in the establishment process. The UE includes, in the RRC Setup Complete message, an indicator indicating that there is establishment failure and resume failure information, stored by the UE itself. Upon receiving the RRC Setup Complete message, the base station requests reporting of the establishment failure and resume failure information using a predetermined RRC message, as needed. Upon receiving the request, the UE reports the establishment failure and resume failure information using a predetermined RRC message.

(1-a)Th Embodiment

A UE, which is in a connected mode, reports, to a base station, capability information indicating whether RRC resume failure reporting, described in the first embodiment, is supported.

An RRC inactive state is optional. Therefore, a UE supporting the RRC inactive state always needs to report the capability information. Alternatively, a UE supporting the RRC inactive state may always support the RRC resume failure reporting.

The base station configures the RRC resume failure reporting for the UE in the connected mode based on the capability information.

The base station transmits an RRCRelease message including a suspend configuration to the UE, and the UE switches to an inactive mode (RRC_Inactive).

The UE triggers the resume process for switching to the connected mode. When the UE RRC triggers the transmission of an RRCResumeRequest message to the physical layer, the RRC starts a predetermined timer.

The timer is stopped if one message among RRCResume, RRCSetup, RRCRelease, and RRCReject messages is received from the base station, a cell reselection operation is triggered, or higher-layer connection establishment is abandoned.

When the timer expires, the UE considers that the resume process has failed and records valid measurement information collected at that time.

Thereafter, the UE performs the resume process again, and if the resume process fails again, the UE deletes previously recorded measurement information and records valid measurement information collected during the recent resume failure.

Thereafter, the UE performs the resume process again. After transmission of the RRCResumeRequest message, if the RRCResume or RRCSetup message is successfully received from the base station, the UE receives an indicator indicating that the valid measurement information collected at the time of the recent resume failure is recorded in the RRCResumeComplete or RRCSetupComplete message corresponding to the RRCResume or RRCSetup message.

The UE transmits the RRCResumeComplete or RRCSetupComplete message to the base station.

The UE may simultaneously perform establishment failure reporting and resume failure reporting. At this time, measurement information recorded at the time of the establishment failure and measurement information recorded at the time of the resume failure are managed independently of each other.

(1-b)Th Embodiment

The (1-b)th embodiment is characterized by integrating reporting at the time of the establishment failure or resume failure.

In order to reduce memory use by the UE, only the measurement information that was recorded at the most recent occurrence of establishment failure or resume failure may be maintained. For example, when the establishment failure occurs, a UE storing measurement information recorded at the time of a previous resume failure deletes the measurement information and records measurement information collected when the recent establishment failure occurs. An availability indicator included in RRCSetupComplete or RRCResumeComplete indicates that there is measurement information recorded due to a failure, regardless of whether the same is establishment failure or resume failure. A base station, which has received the indicator, may request the recorded measurement information. In response to the request, the UE reports the recorded measurement information to the base station. The measurement information includes an indicator indicating whether the measurement information has been collected at the time of the establishment failure or resume failure.

(1-c)Th Embodiment

The (1-c)th embodiment is characterized in that, at the time of performing the logged MDT, a UE additionally collects predetermined information according to the RRC state (idle mode or inactive mode).

A UE, which is in a connected mode, receives, from a base station, configuration information required at the time of performing the logged MDT in the idle mode, the inactive mode, or both modes. The configuration information includes an indicator indicating whether to collect information that can be collected only in a specific RRC state. Upon receiving the RRC message including the configuration information, the UE applies a timer value (logging duration) included in the configuration information to run one timer.

The UE, which is in the connected mode, receives the RRCRelease message from the base station. If suspend configuration information is included in the RRCRelease message, the UE switches to the inactive mode (RRC_Inactive); otherwise, the UE switches to the idle mode (RRC_Idle). The suspend configuration information includes at least I-RNTI, paging cycle, RAN Notification Area information, T380 timer information, and security information. The UE, which performs the logged MDT in the idle mode, the inactive mode, or both modes, stores valid information collected for each configured logging interval (logging time point). The information stored at each logging time point is received in different entries and includes relative time information, and thus the entries can be distinguished from each other.

If the UE is configured to perform the logged MDT in the inactive mode, the UE additionally collects additional information that can be collected only in the inactive mode. For example, the collected information includes a list of RAN notification areas visited by the UE and a number of times that RNA change occurs. The information helps service providers to determine an appropriate RNA. Other information that is collected includes an indicator indicating whether the RRC connection has failed because a T319 timer has expired. Generally, the logged MDT may be performed in both inactive and idle modes. If the UE, which is in the inactive mode, performs the resume operation for switching to the connected mode but it is considered that the resume process has failed due to the expiration of the T319 timer, the UE is switched from the inactive mode to the idle mode. Information relating to when the UE is switched from the inactive mode to the idle mode due to the failure of the resume process is stored as collected information of the logged MDT. At the earliest logging time point after the time point at which the resume process failed, an indicator indicating that the UE is switched from the inactive mode to the idle mode due to the failure of the resume process is received. In addition, indicator information relating to the number of times of preamble transmissions in the resume process, whether contention has occurred, and whether the maximum UE transmission power has been reached may be added.

On the other hand, if the UE is configured to perform the logged MDT in the idle mode, information that can be collected only in the idle mode is additionally collected. For example, the collected information is a list of tracking areas visited by the UE and a number of times that change in the tracking area update (TAU) occurs. The information helps service providers to determine an appropriate TAU.

The logged MDT operation is performed in the idle mode, the inactive mode, or both modes until the logging duration timer expires.

When the UE is switched to the connected mode, RRCSetupComplete or RRCResumeComplete includes an indicator indicating that there is stored MDT information.

At this time, the base station may request the UE to report the MDT information through a predetermined RRC message. For the request, the UE reports the MDT information, which has been collected and stored, using a predetermined RRC message.

Figure 1K:
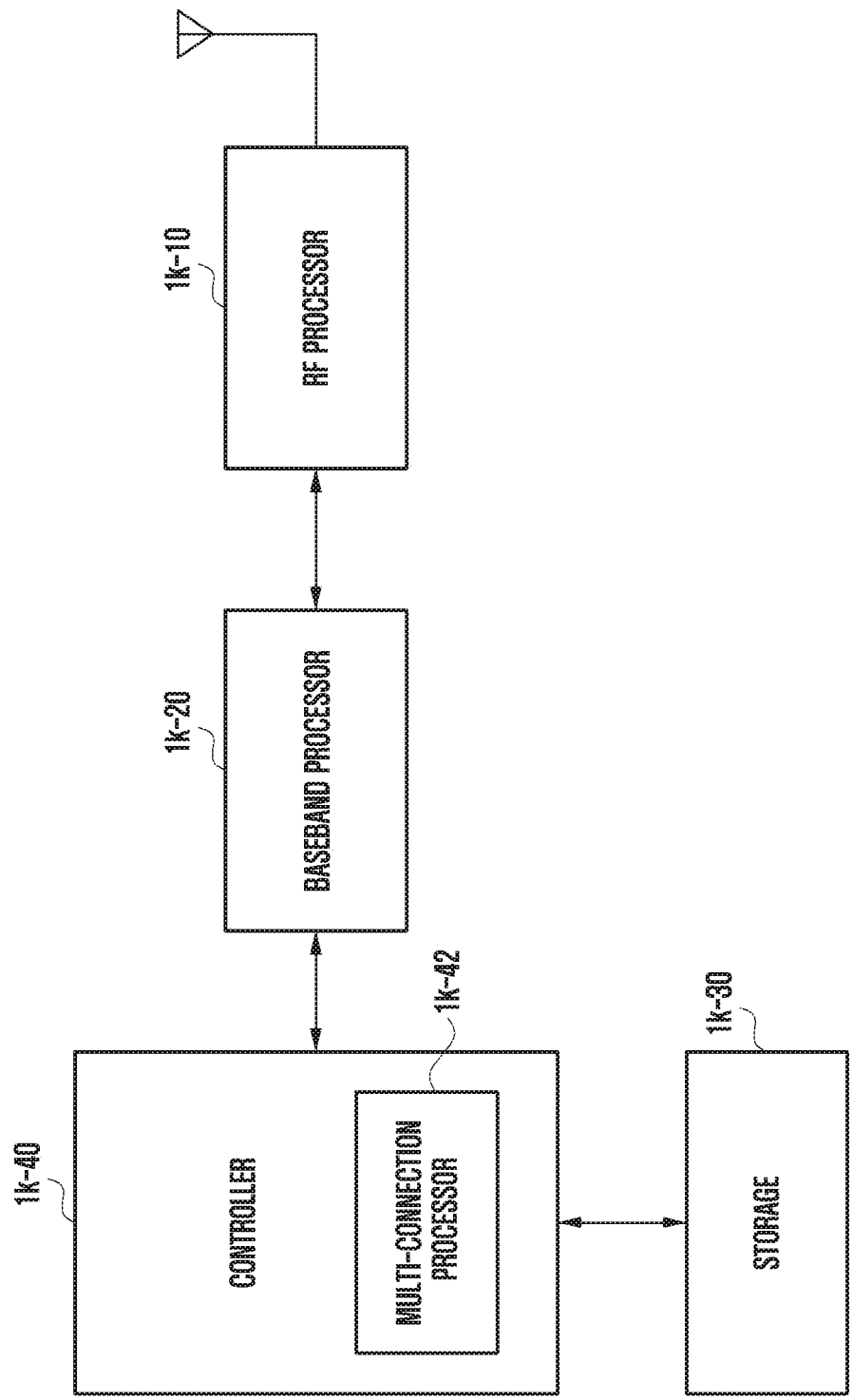
FIG. 1K is a block diagram showing the internal structure of a terminal to which the present embodiment is applied.

FIG. 1K illustrates the structure of the UE.

Referring to FIG. 1K, the UE includes a radio frequency (RF) processor 1k-10, a baseband processor 1k-20, a storage 1k-30, and a controller 1k-40.

The RF processor 1k-10 performs a function for transmitting or receiving a signal through a radio channel, such as band conversion and amplification of a signal. That is, the RF processor 1k-10 up-converts a baseband signal provided from the baseband processor 1k-20 into an RF band signal and transmits the same through an antenna, and down-converts an RF band signal, received through the antenna, to a baseband signal. For example, the RF processor 1k-10 may include a transmission filter, a reception filter, an amplifier, a mixer, an oscillator, a digital to analog converter (DAC), an analog to digital converter (ADC), and the like. In FIG. 1K, only one antenna is shown, but the UE may include a plurality of antennas. In addition, the RF processor 1k-10 may include a plurality of RF chains. Moreover, the RF processor 1k-10 may perform beamforming. In order to perform the beamforming, the RF processor 1k-10 may control the phase and size of each signal transmitted or received through multiple antennas or antenna elements. In addition, the RF processor may perform MIMO operation, and may receive multiple layers in the case of performing MIMO operation.

The baseband processor 1k-20 performs a function for conversion between a baseband signal and a bit stream according to the physical layer standard of the system. For example, if data transmission is performed, the baseband processor 1k-20 generates complex symbols by encoding and modulating a transmission bit stream. In addition, if data reception is performed, the baseband processor 1k-20 reconstructs the received bit string by demodulating and decoding the baseband signal provided from the RF processor 1k-10. For example, in an orthogonal frequency division multiplexing (OFDM) scheme, if data transmission is performed, the baseband processor 1k-20 generates complex symbols by encoding and modulating a transmission bit stream, maps the complex symbols to subcarriers, and then configures OFDM symbols through an inverse fast Fourier transform (IFFT) operation and a cyclic prefix (CP) insertion. Further, if data reception is performed, the baseband processor 1k-20 divides the baseband signal provided from the RF processor 1k-10 in units of OFDM symbols, reconstructs the signals mapped to the subcarriers through a fast Fourier transform (FFT) operation, and then reconstructs a reception bit stream through demodulation and decoding.

The baseband processor 1k-20 and the RF processor 1k-10 transmit and receive signals as described above. Accordingly, each of the baseband processor 1k-20 and the RF processor 1k-10 may be referred to as a transmitter, a receiver, a transceiver, or a communication unit. Furthermore, at least one of the baseband processor 1k-20 and the RF processor 1k-10 may include a plurality of communication modules to support different radio access technologies. In addition, at least one of the baseband processor 1k-20 and the RF processor 1k-10 may include different communication modules to process signals of different frequency bands. For example, the different radio access technologies may include a wireless LAN (for example: IEEE 802.11), a cellular network (for example: LTE), and the like. Further, the different frequency bands may include a super high frequency (SHF) (for example, 2.NRHz and NRhz) band and a millimeter (mm) wave (for example, 60 GHz) band.

The storage 1k-30 stores data, such as a basic program, an application, and configuration information for the operation of the UE. In particular, the storage 1k-30 may store information related to a second access node in which wireless communication is performed using a second wireless access technology. The storage 1k-30 provides stored data at the request of the controller 1k-40.

The controller 1k-40 controls the overall operation of the UE. For example, the controller 1k-40 transmits or receives a signal through the baseband processor 1k-20 and the RF processor 1k-10. In addition, the controller 1k-40 records and reads data in and from the storage 1k-40. To this end, the controller 1k-40 may include at least one processor. For example, the controller 1k-40 may include a communication processor (CP) for performing control for communication and an application processor (AP) for controlling a higher layer such as an application.

FIG. 1H illustrates a block configuration of a base station in a wireless communication system according to a first embodiment of the disclosure.

Figure 1L:
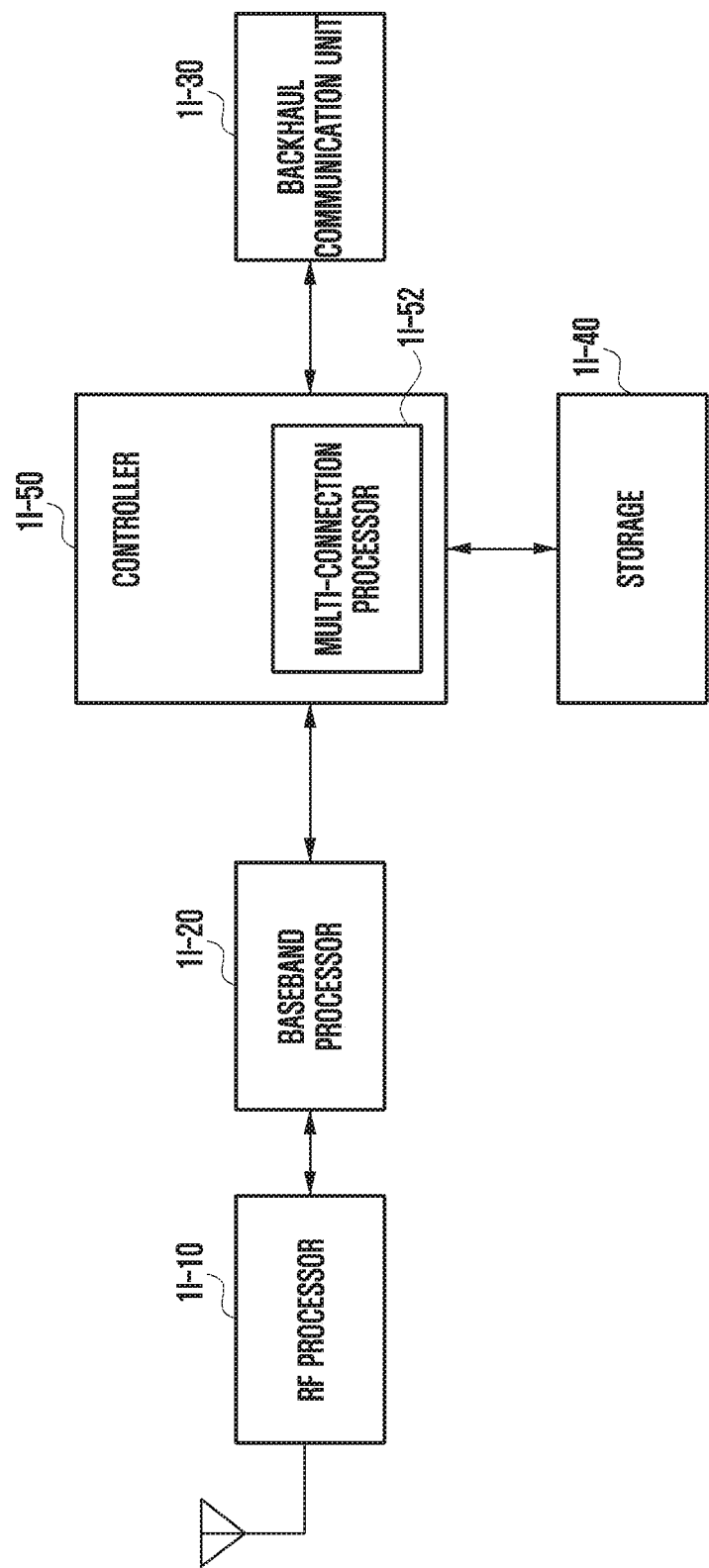
FIG. 1L is a block diagram showing the configuration of a base station according to the present embodiment.

As shown in FIG. 1L, the base station includes an RF processor 1l-10, a baseband processor 1l-20, a backhaul communication unit 1l-30, a storage 1l-40, and a controller 1l-50.

The RF processor 1l-10 performs a function for transmitting or receiving a signal through a radio channel, such as band conversion and amplification of a signal. That is, the RF processor 1l-10 up-converts a baseband signal provided from the baseband processor 1l-20 into an RF band signal and then transmits the converted signal through an antenna, and down-converts an RF band signal received through the antenna into a baseband signal. For example, the RF processor 1l-10 may include a transmission filter, a reception filter, an amplifier, a mixer, an oscillator, a DAC, and an ADC. In FIG. 1L, only one antenna is shown, but the first access node may include a plurality of antennas. In addition, the RF processor 1l-10 may include a plurality of RF chains. In addition, the RF processor 1l-10 may perform beamforming. In order to perform the beamforming, the RF processor 1l-10 may control the phase and size of each of the signals transmitted or received through multiple antennas or antenna elements. The RF processor may perform a downlink MIMO operation by transmitting one or more layers.

The baseband processor 1l-20 performs a function of conversion between the baseband signal and the bit string according to the physical layer standard of the first radio access technology. For example, if data transmission is performed, the baseband processor 1l-20 generates complex symbols by encoding and modulating a transmission bit stream. In addition, if data reception is performed, the baseband processor 1l-20 reconstructs the received bit string by demodulating and decoding the baseband signal provided from the RF processor 1l-10. For example, in an OFDM scheme, if data transmission is performed, the baseband processor 1l-20 may generate complex symbols by encoding and modulating the transmission bit stream, map the complex symbols to subcarriers, and then configure OFDM symbols through an IFFT operation and CP insertion. In addition, if data reception is performed, the baseband processor 1l-20 divides the baseband signal provided from the RF processor 1l-10 in units of OFDM symbols, reconstructs the signals mapped to the subcarriers through an FFT operation, and then reconstructs a reception bit stream through demodulation and decoding. The baseband processor 1l-20 and the RF processor 1l-10 transmit and receive signals as described above. Accordingly, each of the baseband processor 1l-20 and the RF processor 1l-10 may be referred to as a transmitter, a receiver, a transceiver, a communication unit, or a wireless communication unit.

The backhaul communication unit 1l-30 provides an interface for communicating with other nodes in the network. That is, the backhaul communication unit 1l-30 converts a bit stream transmitted from the main station to another node, for example, an auxiliary base station, a core network, and the like, into a physical signal, and converts the physical signal, received from the other node, into a bit stream.

The storage 1l-40 stores data, such as a basic program, an application, and configuration information for the operation of a main base station. In particular, the storage 1l-40 may store information on a bearer allocated to a connected UE, a measurement result reported from the connected UE, and the like. In addition, the storage 1l-40 may store information that is a criterion for determining whether to provide or terminate multiple connections to the UE. The storage 1l-40 provides stored data at the request of the controller 1l-50.

The controller 1l-50 controls the overall operation of the main base station. For example, the controller 1l-50 transmits or receives a signal through the baseband processor 1l-20 and the RF processor 1l-10 or through a backhaul communication unit 1l-30. In addition, the controller 1l-50 records and reads data in and from the storage 1l-40. To this end, the controller 1l-50 may include at least one processor.

Second Embodiment

Terms used to identify access nodes, terms referring to network entities, terms referring to messages, terms referring to interfaces between network objects, and terms referring to various pieces of identification information used in the following description are illustrated for convenience of explanation. Therefore, the disclosure is not limited to the terminologies provided below, and other terms that indicate objects having equivalent technical meanings may be used.

For convenience of explanation, the disclosure uses terms and names defined in a 3rd generation partnership project long term evolution (3GPP LTE) standard. However, the disclosure is not limited to the above terms and names, and may be equally applied to systems conforming to other standards. In the disclosure, an eNB may be used interchangeably with a gNB for convenience of explanation. That is, a base station described as an eNB may be a gNB.

Figure 2A:
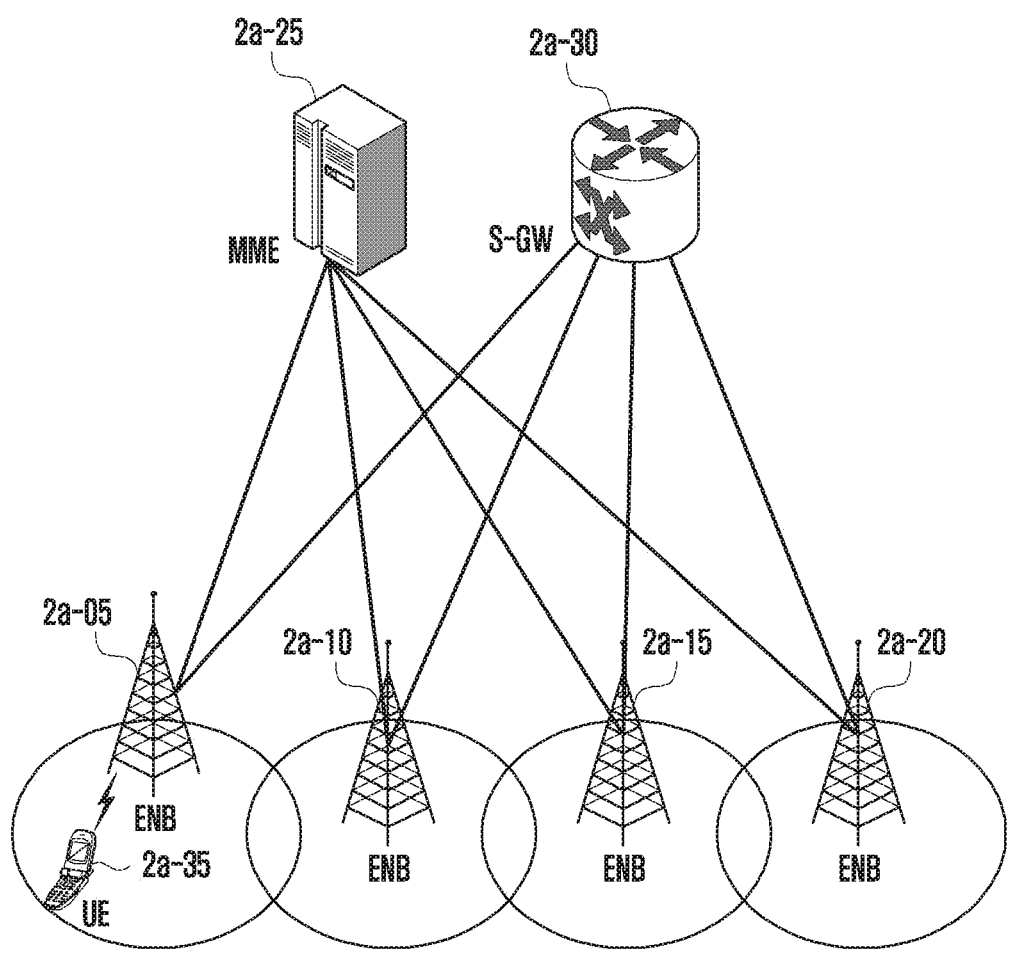
FIG. 2A illustrates the structure of an LTE system to which the present embodiment can be applied.

FIG. 2A illustrates the structure of an LTE system to which the disclosure may be applied.

Referring to FIG. 2A, a radio access network of an LTE system includes next-generation base stations (also referred to as evolved node Bs, hereinafter eNBs, node Bs, or base stations) 2a-05, 2a-10, 2a-15, and 2a-20, a mobility management entity (MME) 2a-25, and a serving gateway (S-GW) 2a-30. A user equipment (hereinafter UE or terminal) 2a-35 accesses an external network through the eNBs 2a-05 to 2a-20 and S-GW 2a-30.

In FIG. 2A, the eNBs 2a-05 to 2a-20 correspond to an existing node B of an UMTS system. The eNBs are connected to the UE 2a-35 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and eNBs 2a-05 to 2a-20 are in charge of this function of the device. In general, one eNB controls a plurality of cells. For example, in order to implement a transmission rate of 100 Mbps, the LTE system uses orthogonal frequency division multiplexing (hereinafter referred to as OFDM) as a radio access technology in the bandwidth of 20 MHz. In addition, the LTE system adopts an adaptive modulation & coding (hereinafter referred to as AMC) scheme for determining a modulation scheme and a channel coding rate based on the channel state of the UE. The S-GW 2a-30 is a device for providing a data bearer and generating or removing a data bearer under the control of the MME 2a-25. The MME is in charge of various control functions in addition to a mobility management function for the UE, and is connected to a plurality of base stations.

Figure 2B:
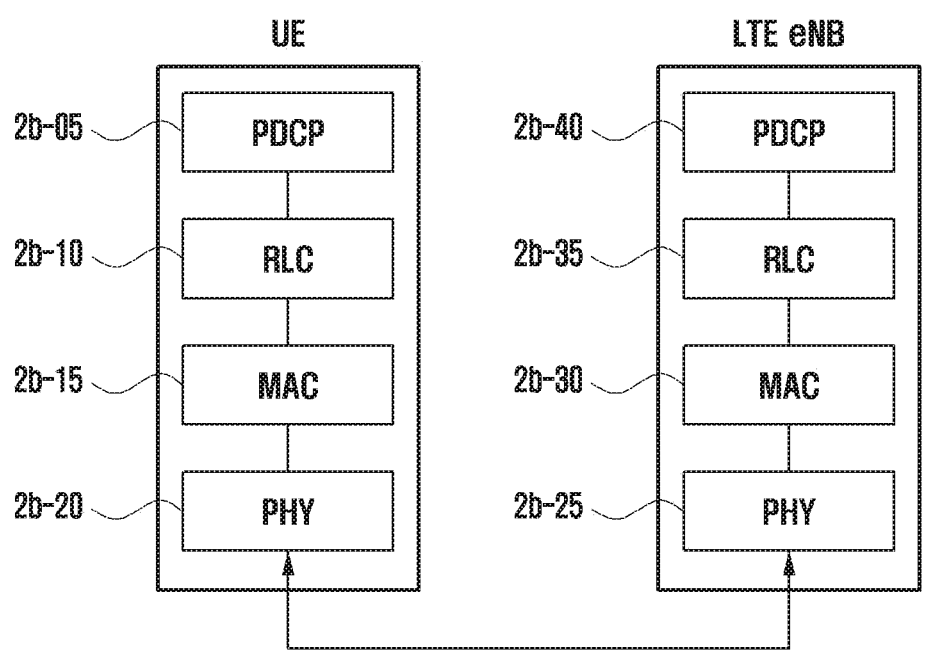
FIG. 2B illustrates a radio protocol structure in an LTE system to which the present embodiment can be applied.

FIG. 2B illustrates a radio protocol architecture in an LTE system to which the disclosure may be applied.

Referring to FIG. 2B, the radio protocol of the LTE system includes packet data convergence protocols (PDCPs) 2b-05 and 2b-40, radio link controls (RLCs) 2b-10 and 2b-35, and medium access controls (MACs) 2b-15 and 2b-30, in a UE and an eNB, respectively. The packet data convergence protocols (PDCPs) 2b-05 and 2b-40 are used to perform operations, such as IP header compression/restoration. The main functions of PDCPs are summarized as follows.

Header compression and decompression: ROHC on
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs in a PDCP re-establishment procedure for RLC AM
Retransmission of PDCP SDUs at handover and, for split bearers in DC, of PDCP PDUs at PDCP data-recovery procedure, for RLC AM)
Ciphering and deciphering
Timer-based SDU discard in uplink Radio link controls (hereinafter referred to as RLCs) 2b-10 and 2b-35 may reconfigure a PDCP packet data unit (PDU) in a suitable size and perform an ARQ operation. The main functions of RLCs are summarized as follows.

Transfer of upper layer PDUs
ARQ (Error Correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 2b-15 and 2b-30 are connected to multiple RLC layer devices configured in one terminal, and may perform an operation of multiplexing RLC PDUs with an MAC PDU and de-multiplexing the RLC PDUs from the MAC PDU. The main functions of the MAC are summarized as follows.

Mapping between logical channels and transport channels
Multiplexing/de-multiplexing of MAC SDUs belonging to one or different logical channels into/from transport blocks (TB) delivered to/from the physical layer on transport channels
Scheduling information reporting
Error correction through hybrid automatic repeat request (HARQ)
Priority handling between logical channels of one UE
Priority handling between UEs by means of dynamic scheduling
MBMS service identification
Transport format selection
Padding Physical layers 2b-20 and 2b-25 may perform operations of channel coding and modulating higher layer data, forming the higher layer data into an OFDM symbol, transmitting the OFDM symbol through a radio channel, or of demodulating an OFDM symbol received through a radio channel, channel-decoding the OFDM symbol, and transmitting the OFDM symbol to a higher layer.

Figure 2C:
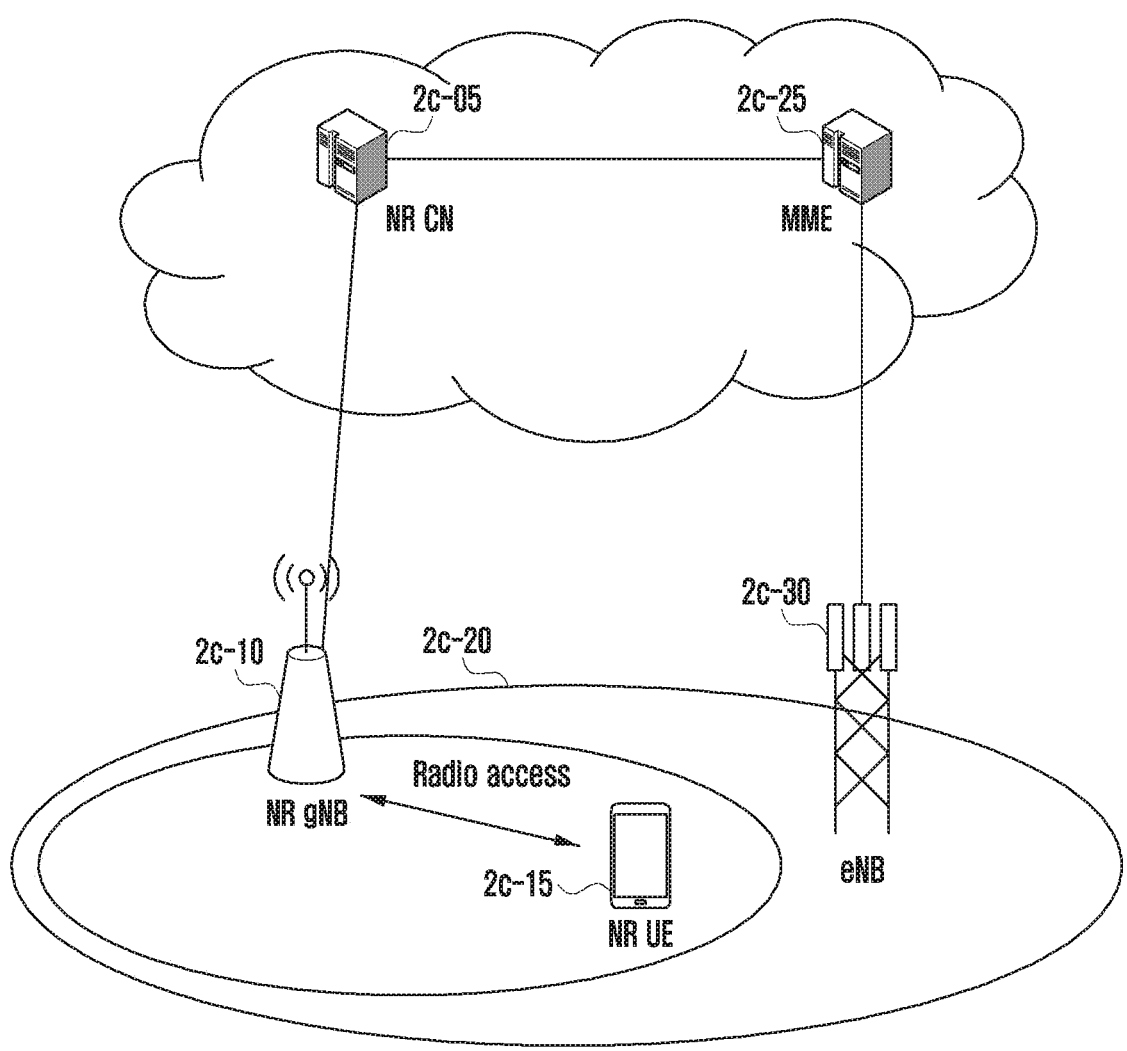
FIG. 2C illustrates the structure of a next-generation mobile communication system to which the present embodiment can be applied.

FIG. 2C illustrates the structure of a next-generation mobile communication system to which the disclosure may be applied.

Referring to FIG. 2C, a radio access network of a next-generation mobile communication system (hereinafter referred to as NR or 5G) includes a new radio node B (hereinafter referred to as an NR gNB or NR base station) 2c-10 and a new radio core network (NR CN) 2c-05. A user terminal (a new radio user equipment, hereinafter referred to as NR UE or a terminal) 2c-15 accesses an external network via an NR gNB 2c-10 and an NR CN 2c-05.

In FIG. 2C, the NR gNB 2c-10 corresponds to an evolved node B (eNB) of the existing LTE system. The NR gNB is connected to the NR UE 2c-15 via a radio channel, and may provide an excellent service as compared to the existing node B. In the next-generation mobile communication system, since all types of user traffics are serviced through a shared channel, there is a need for a device for performing scheduling by collecting state information, such as buffer states, available transmission power states, and channel states of UEs. Further, the NR NB 2c-10 is in charge of this function of the device. In general, one NR gNB typically controls a plurality of cells. In order to implement ultra-high speed data transmission as compared to the existing LTE, the NR gNB may have the existing maximum bandwidth or more, and may additionally employ beamforming technology using orthogonal frequency division multiplexing (hereinafter, referred to as OFDM) as a radio access technology. In addition, the NR gNB adopts an adaptive modulation & coding (hereinafter referred to as AMC) scheme that determines a modulation scheme and a channel coding rate based on the channel state of a UE. The NR CN 2c-05 performs functions, such as mobility support, bearer configuration, QoS configuration, and the like. The NR CN is a device that is in charge of various control functions in addition to a mobility management function for a UE, and is connected to a plurality of base stations. In addition, the next-generation mobile communication system may also operate in conjunction with the existing LTE system, and the NR CN may be connected to an MME 2c-25 via a network interface. The MME is connected to an eNB 2c-30, that is, to the existing base station.

Figure 2D:
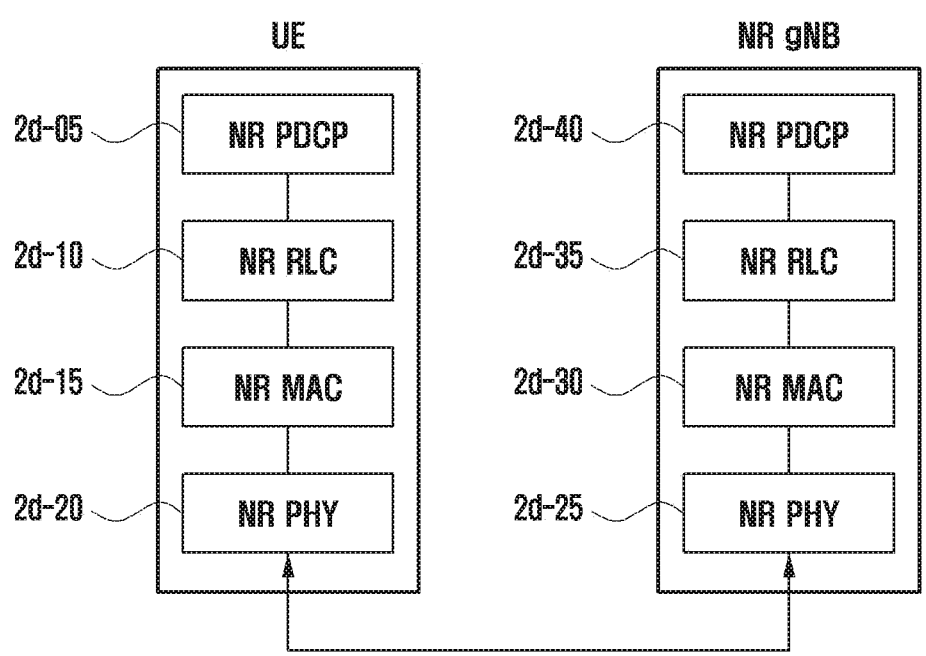
FIG. 2D illustrates a radio protocol structure of a next-generation mobile communication system to which the present embodiment can be applied.

FIG. 2D illustrates a radio protocol architecture of a next-generation mobile communication system to which the disclosure may be applied.

Referring to FIG. 2D, the radio protocol of the next-generation mobile communication system includes NR PDCPs 2d-05 and 2d-40, NR RLCs 2d-10 and 2d-35, and NR MACs 2d-15 and 2d-30, respectively, in a UE and an NR base station. The main functions of the NR PDCPs 2d-05 and 2d-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the reordered sequence, a function of directly transmitting data to a higher layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 2d-10 and 2d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the order of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC sequence number (SN) or PDCP SN, reordering the sequence and recording missing RLC PDUs, providing a state report on the missing RLC PDUs to a transmission side, and requesting retransmission of the missing RLC PDUs. Alternatively, the in-sequence delivery function of the NR RLC device may include a function of sequentially transmitting only RLC SDUs prior to the missing RLC SDU to a higher layer if an RLC SDU is missing, or sequentially transmitting all the RLC SDUs received before a timer starts to a higher layer if the timer expires even if there is a missing RLC SDU, or sequentially transmitting all RLC SDUs received so far to a higher layer if a predetermined timer expires even if there is a missing RLC SDU. In addition, the RLC PDUs may be processed in the sequence in which the RLC PDUS are received (in the sequence of arrival regardless of the serial number or sequence number), and may be transmitted to a PDCP device in out-of sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to a higher layer regardless of the order thereof, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 2d-15 and 2d-30 may be connected to multiple NR RLC layer devices configured in one UE, and the main function of the NR MAC may include some of the following functions.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20 and 2d-25 may perform operations of channel-coding and modulating higher layer data, forming the higher layer data into an OFDM symbol, transmitting the OFDM symbols via a radio channel or demodulating and channel decoding of the OFDM symbols received via the radio channel, and transferring the OFDM symbol to a higher layer.

In the disclosure, Prose per-packet integrity (PPI) is defined to support various V2X services in next-generation mobile communication systems. In addition, the disclosure proposes a method for selecting a sidelink radio bearer (SLRB) carrying V2X sidelink communication data according to a V2X packet or a transmission method, by a UE supporting V2X based on the PPPI defined above. In addition, the disclosure proposes a method for determining a PDCP PDU format according to the value of the PPPI. Therefore, the UE can efficiently transmit or receive V2X messages.

Table 2 shows the classification of type, range, and data rate according to V2X services in the next-generation mobile communication system to which the disclosure is applied.

Referring to Table 2, unlike the existing LTE system, which supports uniform V2X services characterized by a low data rate, a wide communication or transmission range, and a publicized service, including (Releases 14/15 V2X) basic safety message (BSM), a cooperative awareness message (CAM), a decentralized environmental notification message (DENM), a unidirectional P2X service, and the like, the next-generation mobile communication system is expected to support various data rates, communication and transmission areas, and public or private services due to the introduction of new services, such as advanced driving, extended sensors, and platooning. Accordingly, the disclosure proposes a method of classifying V2X services as shown in Table 2 below based on requirements and use cases for each service. The table proposed below refers to 3GPP standard TR 22.886—"Study on enhancement of 3GPP Support for 5G V2X services".

TABLE 2

| | Type | Range | Data Rate | Usage |
|---|---|---|---|---|
| Rel-14/-15 V2X | Public | High | Low | BSM, CAM, DENM, P2X |
| Advanced Driving | Public | Medium | Medium | Information sharing for automated driving, Intersection safety information, Cooperative lane change, etc |
| Extended Sensor | Public | Low (adjacent cars) | High | |
| Platooning | Private/ Public | Medium: Leader -> follower, follower -> leader Low: follower <-> follower | Medium | |

FIG. 2E illustrates V2X communication in a next-generation mobile communication system to which the disclosure is applied.

V2X collectively refers to V2X communication technology through all interfaces with vehicles. V2X includes vehicle-to-vehicle (V2V), vehicle-to-infrastructure (V2I), vehicle-to-pedestrian (V2P), and vehicle-to-network (V2N), depending on the type and elements establishing the communication. V2P and V2V basically follow the structure and the operating principle of Rel-13 device-to-device communication (hereinafter, D2D). For example, V2X communication is based on a sidelink (PC5) operation, and a UE and a base station transmit or receive the actual data packets through the sidelink, which is a transmission channel between UEs, rather than through the uplink and the downlink. This basic concept can be applied not only to V2X defined in LTE, but can also be applied to V2X, which is newly defined in NR, and yet-to-be introduced scenarios.

A base station 2e-01 includes one or more vehicle UEs 2e-05 and 2e-10 located in a cell 2e-02 supporting V2X and a pedestrian-carried mobile UE 2e-15. For example, the vehicle UE 2e-05 performs cellular communication with the base station 2e-01 using links (Uu) 2e-30 and 2e-35 between the vehicle UE and the base station, and the vehicle UE 2e-05 performs D2D communication with another vehicle UE 2e-10 or a pedestrian-carried mobile UE 2e-15 using the side links PC5, 2e-20, and 2e-25. In the above, the base station may be an upgraded eNB supporting gNB or NR. In order for the vehicle UE 2e-05 and another vehicle 2e-10 or the vehicle UEs 2e-05 and 2e-10 and the pedestrian-carried mobile UE 5C-15 to transmit or receive information directly through the side links 2e-20 and 2e-25, the base station needs to allocate a resource pool that can be used for sidelink communication. Below, a method for allocating resources to a UE by a base station in V2X in the LTE system is summarized in detail, and a similar approach to that of the LTE system can be applied to V2X, introduced in the NR system. However, various numerologies are used in the NR system, and thus the sidelink resource pool may be designed to be somewhat different.

Methods in which a base station allocates resources to a UE may be divided into two types: scheduled resource allocation (mode 3) and UE autonomous resource allocation (mode 4). Scheduled resource allocation is a method in which the base station allocates resources used for sidelink transmission to RRC-connected UEs using a dedicated scheduling scheme. The method is effective for interference management and resource pool management (dynamic allocation, semi-persistence transmission) because the base station can manage the sidelink resources. In addition, in the case of the scheduled resource allocation (mode 3) in which the base station allocates and manages resources for V2X, when the RRC-connected UE includes data to be transmitted to other UEs, the data can be transmitted to the base station using an RRC message or MAC control element (hereinafter referred to as CE). Here, SidelinkUEInformation and UEAssistanceInformation messages may be used as the RRC message. Meanwhile, the MAC CE may be, for example, a buffer status report MAC CE in a new format (including at least an indicator indicating that the buffer status report is for V2P communication and information on the size of data buffered for D2D communication). For detailed format and contents of the buffer status report used in 3GPP, reference is to be made to 3GPP standard TS36.321—"E-UTRA MAC Protocol Specification". On the other hand, in the case of UE autonomous resource allocation, the base station provides a sidelink transmission/reception resource pool for V2X as system information, and the UE selects a resource pool according to a predetermined rule. The resource selection method may include zone mapping regardless of services or service types, sensing-based resource selection, and random selection. The structure of the resource pool for V2X may be configured such that one sub-channel may be configured by arranging resources 2e-40, 2e-50, and 2e-60 for scheduling allocation (SA) and resources 2e-45, 2e-55, and 2e-65 for data transmission to be adjacent to each other, and resources 2e-70, 2e-75, and 2e-80 for SA and resources 2e-85, 2e-90, and 2e-95 for data transmission may be used in a non-adjacent manner. Even if one of the two structures is used, the SA is configured by two consecutive PRBs, and includes contents indicating the location of a resource for data transmission. Multiple UEs may receive a V2X service in one cell, and the relationship between the base stations 2e-01 and UEs 2e-05, 2e-10, and 2e-15 described above can be extended and applied.

Figure 2F:
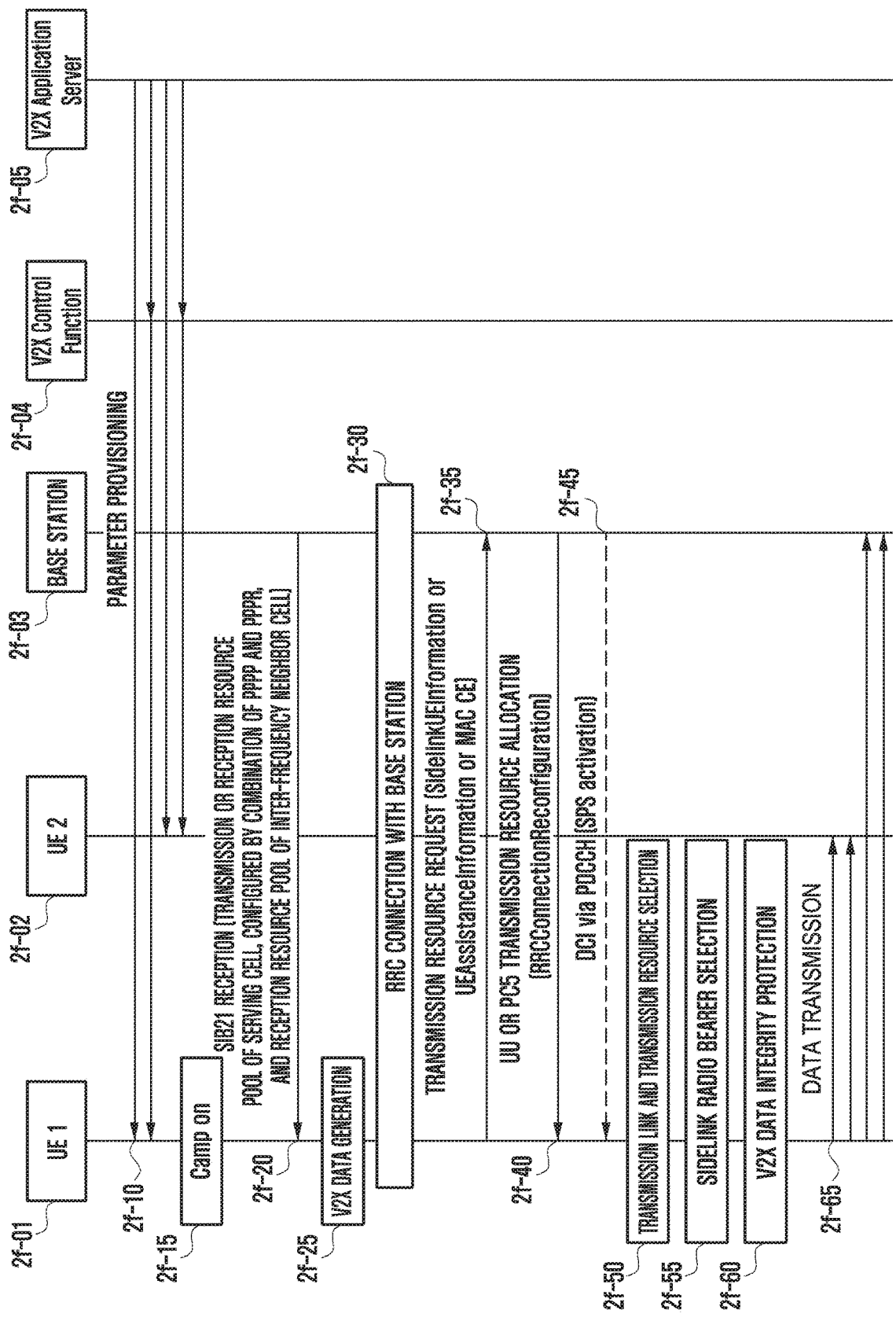
FIG. 2F illustrates a monitoring and data transmission procedure of a V2X UE operating in mode 3 when a resource pool for each service and a resource pool regardless of a service type coexist in a next-generation mobile communication system.

FIG. 2F illustrates a data transmission procedure of a V2X UE operating in mode 3 in a next-generation mobile communication system.

Referring to FIG. 2F, a V2X application server 2f-05 initially provisions parameter information in order to enable UEs 2f-01 and 2f-02 to perform V2X communication (indicated by reference numeral 2f-10). In addition, a V2X control function 2f-04 may receive parameter information from the V2X application server 2f-05, and may initially provision the parameter information to enable the UEs 2f-01 and 2f-02 to perform V2X communication (indicated by reference numeral 2f-10). The provisioned parameter includes mapping information between V2X services and destination Layer-2 ID(s). For example, since new V2X services such as platooning, advanced driving, and extended sensors needs to be supported in the next-generation mobile communication system, the new V2X services, like existing V2X services, map to destination Layer-2 ID(s) through identifiers such as a provider service identifier (PSID), intelligent transport system application identifiers (ITS-AIDs), or new identifiers for V2X applications. In addition, the provisioned parameters may include mapping information between V2X frequencies and V2X services, between V2X frequencies and V2X service types (for example, PSID, ITS-AIDs, or new identifiers specified above), or between V2X frequencies and radio access technologies (RATs). Here, the V2X frequencies may indicate a V2X LTE frequency, a V2X NR frequency, or both frequencies, and accordingly, the radio access technology may also indicate E-UTRA, NR, or both technologies. In addition, the mapping information specified above may additionally include information about a geographical area(s). For example, the mapping information may also include information about a geographical area because the list of available V2X services or the type of available V2X services may differ according to a geographical area such that the use of V2X frequencies is impossible due to local regulations in a specific geographical area or such that the use of V2X frequencies is possible in a security-sensitive geographical area. In addition, the provisioned parameter information includes mapping information between a V2X service and a communication range or transmission range. In addition, the provisioned parameter includes, in order to perform V2X communication, mapping information between a ProSe per-packet priority (PPPP) and a packet delay budget, mapping information between the V2X service and the PPPP, mapping information between the V2X service and the ProSe per-packet reliability (PPPR), or mapping information between the V2X service and ProSe per-packet integrity (PPPI). In addition, the provisioned parameter may also include mapping information between the V2X service and a data transmission type. Here, the data transmission type denotes broadcast, multicast, groupcast, or unicast. In addition, the provisioned parameters include a transmission resource pool and a reception resource pool, configured by PPPP, PPPR, or a combination of PPPP and PPPR. The UEs 2f-01 and 2f-02 pre-configure the parameters, initially provisioned from the V2X application server 2f-05 or the V2X control function 2f-04.

If UE 1 2f-01, which has pre-configured the parameters, is interested in a specific V2X service x, UE 1 searches for a suitable cell by performing cell selection or a cell selection procedure so as to search for a cell to camp on (indicated by reference numeral 2f-15). That is, the UE searches for a cell in which the UE is to camp on a V2X frequency supported by a home public land mobile network (HPLMN) mapped to a specific V2X service x. UE 1 2f-01, which is camping on the cell, receives SIB21 from the base station 2f-03 (indicated by reference numeral 2f-20).

The system information 2f-20 includes a transmission resource pool and a reception resource pool, configured by PPPP, PPPR, or a combination of PPPP and PPPR. Specifically, the system information includes information of a transmission resource pool and a reception resource pool of a serving cell and information of a reception resource pool of an inter-frequency neighbor cell. Further, the system information includes information for configuring synchronization with inter-RAT service-specific resource pool information, zone configuration information in which a UE autonomously selects a resource and transmits data, priority configuration information of sidelink (PC5) and LTE/NR uplink or downlink (Uu), resource pool configuration information (e.g., a time-domain resource in a bitmap format, a frequency-domain resource, subcarrier spacing information when NR is supported, or a cyclic prefix length), transmission power configuration information including maximum allowed transmission power, and configuration information for a sensing operation.

If a V2X packet for transmission is generated (indicated by reference numeral 2f-25), UE 1 2f-01, which reads the system information, determines values for PPPP, PPPR and PPPI applicable to the packet based on the V2X service provisioned by the packet. Then, the UE determines a transmission resource pool using a combination of PPPP and PPPR corresponding to the packet, and then establishes an RRC connection with the base station (indicated by reference numeral 2f-30). In the RRC connection process, the UE may add information on a specific V2X service x (for example, PPPP, PPPR, or PPPI) to the base station or transmit information on the determined transmission resource pool through the RRC message. The determination of the transmission resource pool may be performed after establishment of the RRC connection. The RRC connection process may be performed before data traffic for a specific V2X service x is generated (indicated by reference numeral 2f-30).

UE 1 2f-01 requests the base station 2f-03 to transmit resources capable of V2X communication with another UE 2f-02 or the base station 2f-03 (indicated by reference numeral 2f-35). At this time, UE 1 may request a transmission resource from a transmission resource pool determined by a combination of PPPP and PPPR corresponding to the V2X packet. UE 1 2f-01 may transmit a request to the base station using an RRC message or a MAC control element (CE). Here, SidelinkUEInformation and UEAssistanceInformation messages may be used as the RRC messages. Meanwhile, the MAC CE may be, for example, a buffer status report MAC CE in a new format (including at least an indicator indicating that the buffer status report is for V2P communication and information on the size of data buffered for D2D communication). The base station 2f-03 allocates V2X transmission resources to UE 1 2f-01 through a dedicated RRC message (indicated by reference numeral 2f-40). The dedicated RRC message may be included in the RRC-ConnectionReconfiguration message. The resource allocation may be performed for a V2X resource through Uu or a resource for PC5 according to a transmission resource, traffic type, whether a corresponding link is congested, or a V2X service, requested by the UE. For the determination of the transmission pool, the UE additionally transmits PPPP, PPPR, PPPI, or LCID information of V2X traffic through the UEAssistanceInformation or MAC CE. Since the base station also possesses information about resources used by other UEs, the base station schedules the resource requested by the UE from among the remaining resources. In addition, if SPS configuration information through Uu is included in the RRC message, SPS can be activated using DCI transmission through PDCCH (indicated by reference numeral 2*f*-45). UE 1 5*d*-01 selects a transmission link and a transmission resource according to a resource and a transmission method allocated from the base station 5*d*-03 (indicated by reference numeral 2*f*-50).

UE 1 2*f*-01, which selects the transmission link and the transmission resource, determines a sidelink radio bearer (SLRB) (indicated by reference numeral 2*f*-55). The SLRB includes a PDCP entity and an RLC entity. The disclosure proposes that one SLRB is divided into an SRC/DST pair and a combination of PPPP, PPPR, PPPI, and LCID. For example, the SLRB may be divided into SRC, DST, and PPPI, or SRC, DST, PPPI, and PPPR. In the case in which the V2X packet generated for transmission includes an SLRB divided into SRC, DST, and PPPI, UE 1 2*f*-01 selects the corresponding SLRB. If there is no SLRB classified as SRC, DST, and PPPI, a new SLRB is created (established). The SLRB selection or establishment method described above can be applied by extending or contracting a relationship of any combination of SRC, DST, PPPI, PPPR, PPPP, and LCID (indicated by reference numeral 2*f*-55).

UE 1 2*f*-01, which selects or establishes a SLRB, processes integrity protection of the V2X packet in the PDCP layer (indicated by reference numeral 2*f*-60). If PPPI is 1, UE 1 2*f*-01 calculates MAC-I and adds the MAC-I to the endmost part of the V2X packet to form a PDCP data PDU. In addition, UE 1 2*f*-01 may calculate MAC-I according to the values of PPPP and PPPR, add the MAC-I to the endmost part of the V2X packet to form a PDCP data PDU. The disclosure proposes adding a 1-bit indicator to the PDCP header to introduce an indication value indicating a calculated MAC-I value exists. For example, when the 1-bit indicator value is 1, the disclosure may indicate that a calculated MAC-I value exists. Meanwhile, when the 1-bit indicator value is 0, the disclosure may indicate that a calculated MAC-I value does not exist. The UE, which has formed the PDCP Data PDU, transmits data to UE 2 2*f*-02 or the base station 2*f*-03 using the transmission resource pool selected based on the PPPP or PPPR (indicated by reference numeral 2*f*-65).

FIG. 2G illustrates a data transmission procedure of a V2X UE operating in mode 4 in a next-generation mobile communication system.

Referring to FIG. 2G, a V2X application server 2*g*-05 initially provisions parameter information to enable UEs 2*g*-01 and 2*g*-02 to perform V2X communication (indicated by reference numeral 2*g*-10). In addition, a V2X control function 2*g*-04 may receive parameter information from the V2X application server 2*g*-05, and may initially provision the parameter information to enable the UEs 2*g*-01 and 2*g*-02 to perform V2X communication (indicated by reference numeral 2*g*-10). The provisioned parameter information includes mapping information between V2X services and destination Layer-2 ID(s). For example, since new V2X services such as platooning, advanced driving, and extended sensors needs to be supported in next-generation mobile communication systems, the new V2X services, like existing V2X services, are mapped to destination Layer-2 ID(s) through identifiers such as a provider service identifier (PSID), intelligent transport system application identifiers (ITS-AIDs), or new identifiers for V2X applications. In addition, the provisioned parameters may include mapping information between V2X frequencies and V2X services, between V2X frequencies and V2X service types (for example, PSID, ITS-AIDs, or new identifiers specified above), or between V2X frequencies and radio access technologies (RATs). Here, the V2X frequencies may indicate a V2X LTE frequency, a V2X NR frequency, or both frequencies, and accordingly, the radio access technology may also indicate E-UTRA, NR, or both technologies. In addition, the mapping information specified above may additionally include information about a geographical area(s). For example, the mapping information may also include information about a geographical area because the list of available V2X services or the type of available V2X service may differ according to a geographical area such that the use of V2X frequencies is impossible due to local regulations in a specific geographical area or the use of V2X frequencies is possible in a security-sensitive geographical area. In addition, the provisioned parameter includes mapping information between a V2X service and a communication range or transmission range. In addition, the provisioned parameter includes, in order to perform V2X communication, mapping information between a ProSe per-packet priority (PPPP) and a packet delay budget, mapping information between the V2X service and the PPPP, mapping information between the V2X service and the ProSe per-packet reliability (PPPR), or mapping information between the V2X service and ProSe per-packet integrity (PPPI). In addition, the provisioned parameter may also include mapping information between the V2X service and a data transmission type. Here, the data transmission type denotes broadcast, multicast, groupcast, or unicast. In addition, the provisioned parameters include a transmission resource pool and a reception resource pool, configured by PPPP, PPPR, or a combination of PPPP and PPPR. The UEs 2*g*-01 and 2*g*-02 pre-configure the parameters initially provisioned from the V2X application server 2*g*-05 or the V2X control function 2*g*-04.

There is a difference in that, unlike mode 3, in which the base station 2*g*-03 is involved in resource allocation by itself, according to mode 4 operation, UE 1 2*g*-01 autonomously selects resources and transmits data based on a resource pool received in advance through system information. The disclosure proposes that, in V2X communication, the base station 2*g*-03 allocates a sidelink resource pool (V2V resource pool, V2P resource pool) for UE 1 2*g*-01 based on a combination of PPPP and PPPR. The resource pool includes a resource pool from which the UE can autonomously select an available resource after sensing the resources used by other neighboring UEs, and a pre-configured resource pool from which the UE randomly selects a resource.

If UE 1 2*g*-01, which has pre-configured the parameters, is interested in a specific V2X service x, UE 1 searches for a suitable cell by performing cell selection or a cell selection procedure so as to search for a cell to camp on (indicated by reference numeral 2*g*-15). That is, the UE searches for a cell in which the UE is to camp on a V2X frequency supported by a home public land mobile network (HPLMN) mapped to a specific V2X service x. UE 1 2*g*-01, which is camping on the cell, receives SIB21 from the base station 2*g*-03 (indicated by reference numeral 2*g*-20).

The system information 2*f*-20 includes a transmission resource pool and a reception resource pool, configured by PPPP, PPPR, or a combination of PPPP and PPPR. Specifically, the system information includes information of a transmission resource pool and a reception resource pool of a serving cell and information of a reception resource pool of an inter-frequency neighbor cell. Further, the system information includes information for configuring synchronization with inter-RAT service-specific resource pool information, zone configuration information in which a UE autonomously selects a resource and transmits data, priority configuration information of sidelink (PC5) and LTE/NR uplink or downlink (Uu), resource pool configuration information (e.g., a time-domain resource in a bitmap format, a frequency-domain resource, subcarrier spacing information when NR is supported, or a cyclic prefix length), transmission power configuration information including maximum allowed transmission power, and configuration information for sensing operation.

When data traffic for V2X is generated in UE 1 2g-01 (indicated by reference numeral 2g-15), UE 1 2g-01, selects transmission resources in the time or frequency domain among resource pools, received through the system information from the base station 2g-03, according to the configured transmission operation (one-time transmission of dynamic allocation, multiple transmission of dynamic allocation, sensing-based one-time transmission, sensing-based multiple transmission, and random transmission) or PPPP/PPPR (indicated by reference numeral 2g-30). UE 1 2g-01, which selects the transmission resource, determines a sidelink radio bearer (SLRB) (indicated by reference numeral 2g-35). The SLRB includes a PDCP entity and an RLC entity. The disclosure proposes that one SLRB is divided into an SRC/DST pair and a combination of PPPP, PPPR, PPPI, and LCID. For example, the SLRB may be divided into SRC, DST, and PPPI, or SRC, DST, PPPI, and PPPR. In the case in which the V2X packet generated for transmission includes an SLRB divided into SRC, DST, and PPPI, UE 1 2g-01 selects the corresponding SLRB. If there is no SLRB classified as SRC, DST, and PPPI, a new SLRB is created (established). The SLRB selection or establishment method described above can be applied by extending or contracting a relationship of any combination of SRC, DST, PPPI, PPPR, PPPP, and LCID (indicated by reference numeral 2g-35).

UE 1 2g-01, which selects or establishes a SLRB, processes integrity protection of the V2X packet in the PDCP layer (indicated by reference numeral 2g-40). If PPPI is 1, UE 1 2g-01 calculates MAC-I and adds the MAC-I to the endmost part of the V2X packet to form a PDCP data PDU. In addition, UE 1 2g-01 may calculate MAC-I according to the values of PPPP and PPPR, add the MAC-I to the endmost part of the V2X packet to form a PDCP data PDU. The disclosure proposes adding a 1-bit indicator to the PDCP header to introduce an indication value indicating a calculated MAC-I value exists. For example, when the 1-bit indicator value is 1, the disclosure may indicate that a calculated MAC-I value exists. Meanwhile, when the 1-bit indicator value is 0, the disclosure may indicate that a calculated MAC-I value does not exist. The UE that formed the PDCP Data PDU, transmits data to UE 2 2g-02 or the base station 2g-03 using the transmission resource pool selected based on the PPPP or PPPR (indicated by reference numeral 2g-45).

Figure 2H:
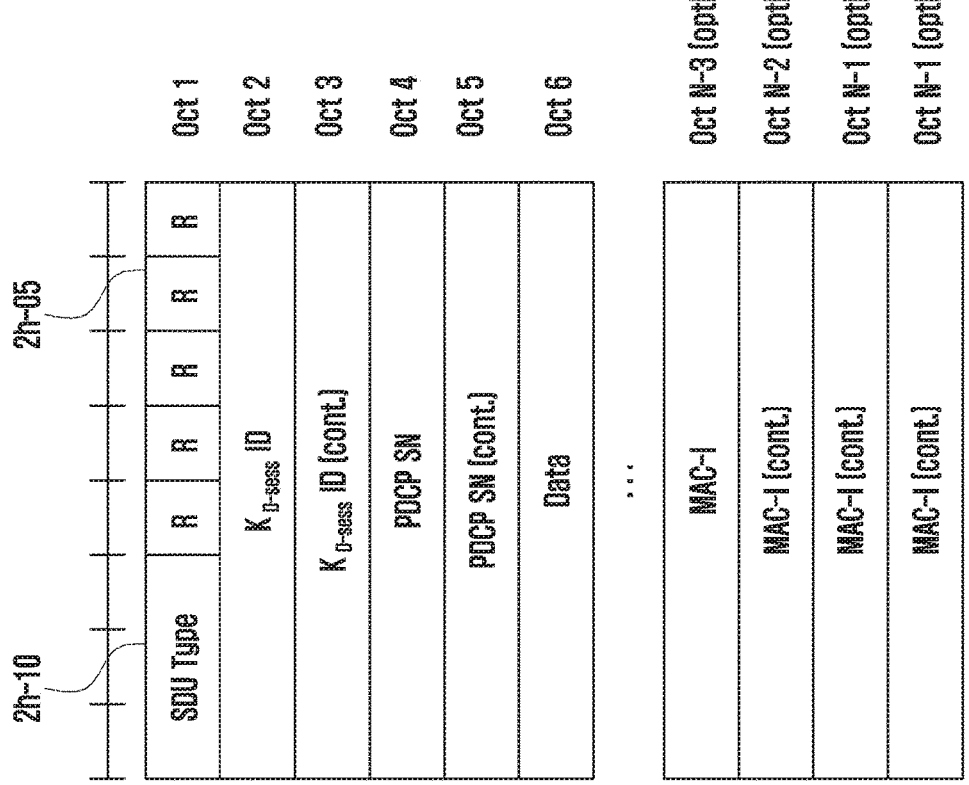
FIG. 2H illustrates a PDCP PDU format in an NR V2X system according to an embodiment of the disclosure.
Figure 21:
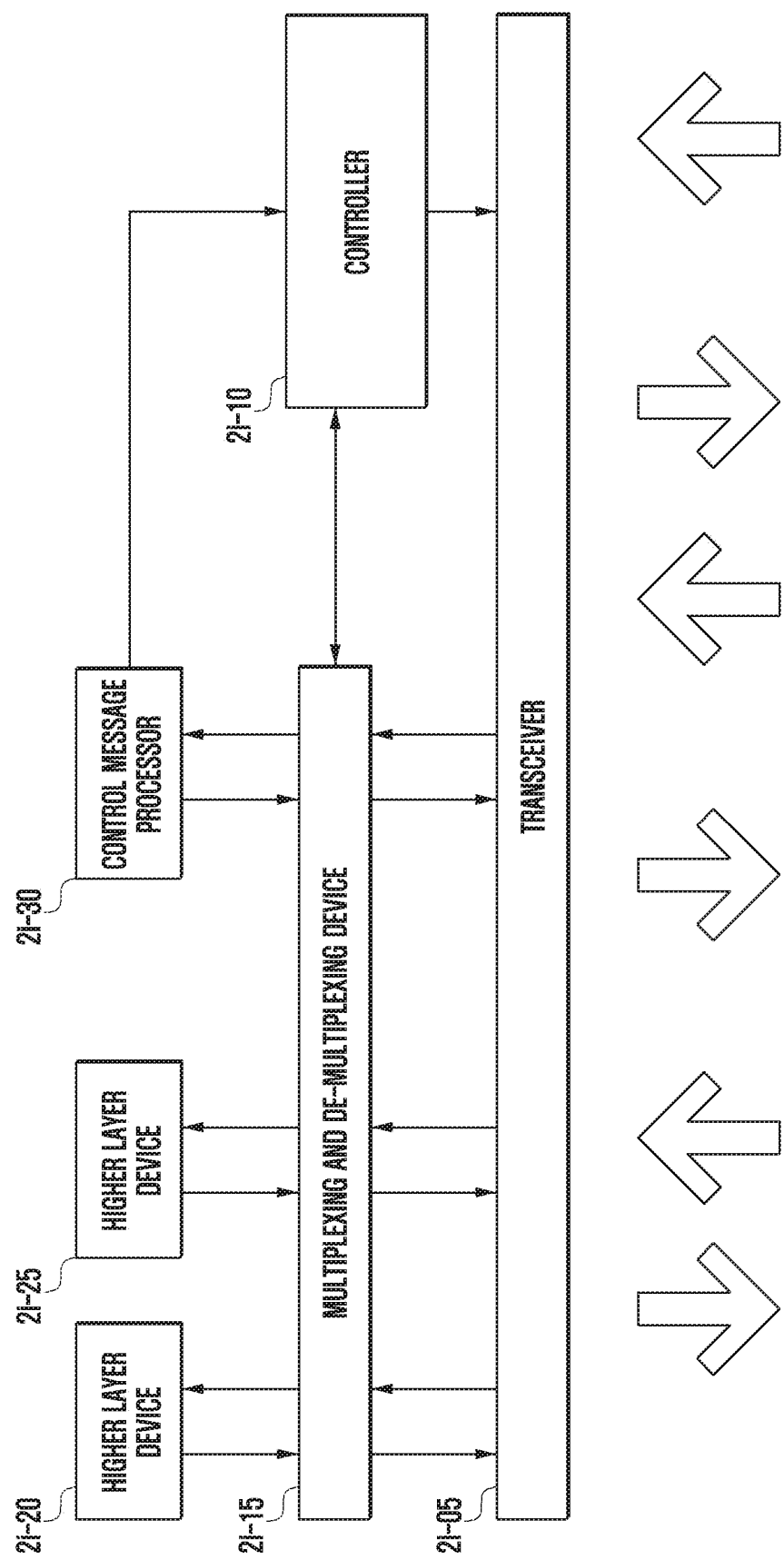

FIG. 2H illustrates a PDCP PDU format in an NR V2X system according to an embodiment of the disclosure.

Regarding parts (a) and (b) of FIG. 2H, they illustrate a PDCP PDU format applied to broadcast, multicast, groupcast, or unicast in the NR V2X system proposed in the disclosure. The disclosure proposes to introduce a 1-bit indicator to the PDCP header to indicate whether MAC-I exists in the PDCP PDU format. For example, an R field 2h-05 is a bit that is reserved for an additional function that can be used later and thus can also be used as a 1-bit indicator indicating whether MAC-I exists in the R field. In addition, in the current SDU types 2h-10 and 2h-15, "100" to "111" are reserved for additional functions that can be used later, and the disclosure proposes use of one of these values to indicate whether MAC-I exists.

FIG. 2I illustrates a block configuration of a UE according to the disclosure.

As shown in FIG. 2I, a UE according to the second embodiment of the disclosure includes a transceiver 2i-05, a controller 2i-10, a multiplexing and de-multiplexing unit 2i-15, various types of higher layer processors 2i-20 and 2i-25, and a control message processor 2i-30.

The transceiver 2i-05 receives data and a predetermined control signal through a forward channel of a serving cell, and transmits data and a predetermined control signal through a reverse channel. In the case in which multiple serving cells are configured, the transceiver 2i-05 performs data transmission or reception and control signal transmission or reception through the multiple serving cells. The multiplexing and de-multiplexing unit 2i-15 multiplexes data generated in the higher layer processors 2i-20 and 2i-25 or the control message processor 2i-30 or de-multiplexes data received from the transceiver 2i-05, and transfers the multiplexed data or de-multiplexed data to suitable higher layer processors 2i-20 and 2i-25 or the control message processor 2i-30. The control message processor 2i-30 transmits or receives control messages from the base station and performs necessary operations. The operations include a function of processing the RRC message and the control message such as MAC CE, and a function of reporting of CBR measurement values and reception of RRC messages for the resource pool and the UE operation. The higher layer processors 2i-20 and 2i-25 refer to a DRB device and may be configured according to services. The higher layer processors 2i-20 and 2i-25 perform processing of data generated by user services, such as file transfer protocol (FTP) or voice over internet protocol (VoIP), and transfer the processed data to the multiplexing and de-multiplexing unit 2i-15, or process data transferred from the multiplexing and de-multiplexing unit 2i-15 and transfer the processed data to a service application in the higher layer. The controller 2i-10 identifies scheduling commands, received through the transceiver 2i-05, for example, reverse grants, so as to control the transceiver 2i-05 and the multiplexing and de-multiplexing unit 2i-15 to allow reverse transmission to be performed in an appropriate transmission resource at an appropriate time. Meanwhile, although it has been described that the UE includes a plurality of blocks and that respective blocks perform different functions, this is only an example, and the disclosure is not necessarily limited thereto. For example, the controller 2i-10 itself may perform a function performed by the multiplexing and de-multiplexing unit 2i-15.

Figure 2J:
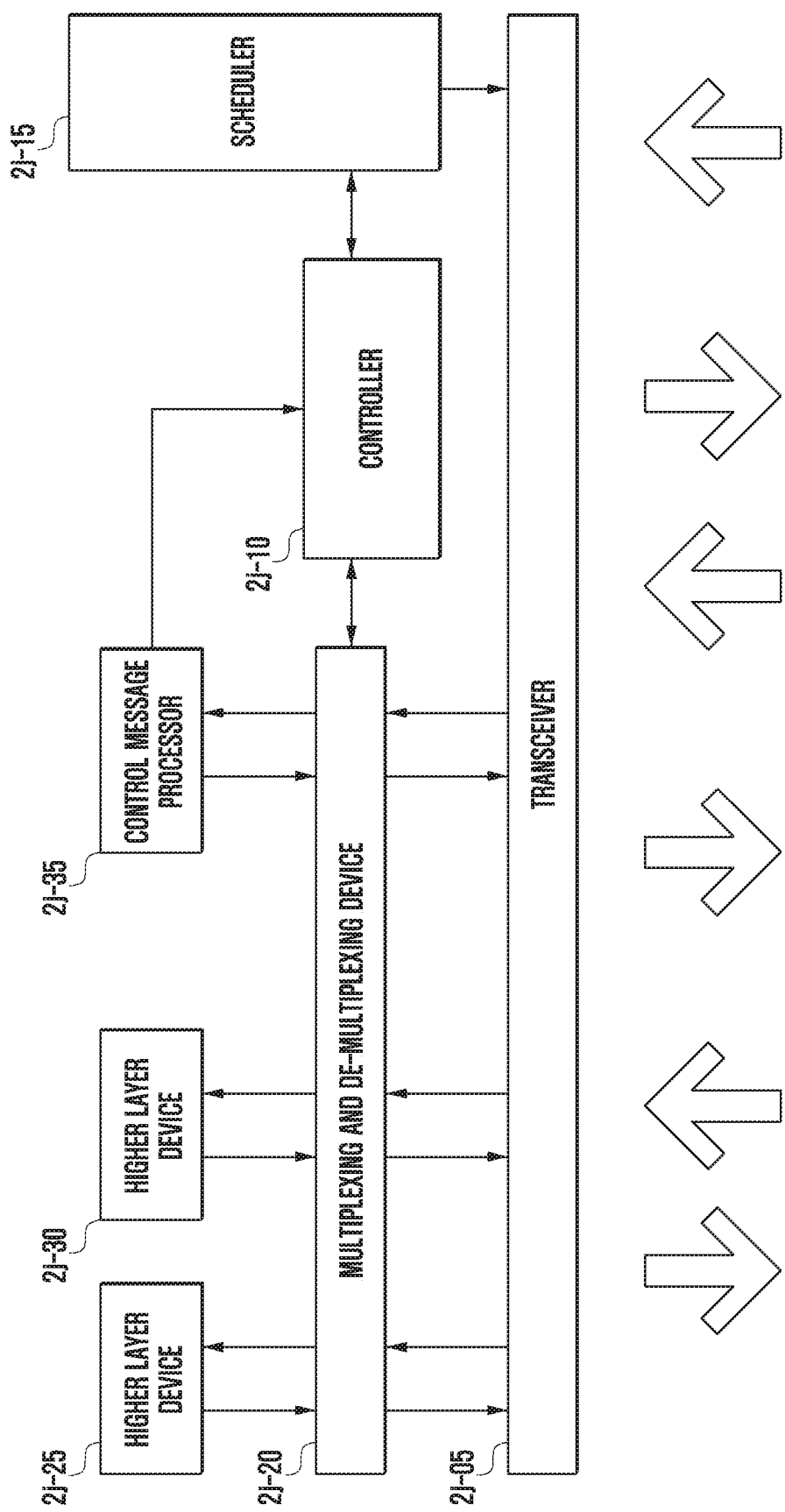
FIG. 2J is a block diagram illustrating the configuration of a base station according to the present embodiment.

FIG. 2J illustrates a block configuration of a base station according to the disclosure.

A base station apparatus of FIG. 2J includes a transceiver 2j-05, a controller 2j-10, a multiplexing and de-multiplexing unit 2j-20, a control message processor 2j-35, various types of higher layer processors 2j-25 and 2j-30, and a scheduler 2j-15.

The transceiver 2j-05 transmits data and a predetermined control signal through a forward carrier and receives data and a predetermined control signal through a reverse carrier. When multiple carriers are configured, the transceiver 2j-05 performs data transmission or reception and control signal transmission or reception through multiple carriers. The multiplexing and de-multiplexing unit 2j-20 multiplexes data generated in the higher layer processors 2j-25 and 2j-30 or the control message processor 2j-35 or de-multiplexes data received from the transceiver 2j-05, and transfers the multiplexed data or de-multiplexed data to the suitable higher layer processors 2j-25 and 2j-30, the control message processor 2j-35, or the controller 2j-10. The control message processor 2j-35, under the instruction of the controller, generates a message to be transferred to the UE, and transfers the message to a lower layer. The higher layer processors 2j-25 and 2j-30 may be configured for each UE or each service, perform processing of data generated from user services such as FTP or VoIP, and transmit the processed data to the multiplexing and de-multiplexing unit 2j-20, or perform processing of data transferred from the multiplexing and de-multiplexing unit 2j-20 and transfer the processed data to a service application in the higher layer. The scheduler 2j-15 allocates transmission resources to the UE at an appropriate time in consideration of the buffer state of the UE, the channel state, and the active time of the UE, performs processing of a signal, which is transmitted to the transceiver by the UE, and allows the UE to transmit the signal.

The details of the second embodiment described above can be summarized as the following points.

Main Point

1. Support Integrity Protection for V2X traffic
2. Per packet integrity (PPPI) to indicate whether certain packet shall be integrity protected.
3. 1 bit indication in PDCP header to indicate MAC-I presence
4. PPPP/PPPR for Resource pool selection & PPPI for SLRB selection Overall Flow 1: UE<-V2X server: Parameter provisioning
  The mapping of Destination Layer-2 ID(s) and the V2X services, e.g. PSID, ITS-AIDs, ES, platooning . . .
  The mapping of services to V2X frequencies/RATs (LTE or NR or both)
  The mapping of services to range (high, medium, low)
  The mapping of services to PPPP, PPPR, PPPI (0=no IP, 1=IP)
  The mapping of services to transmission type (broadcast, groupcast, unicast)
2: UE interested in V2X service x: Camping on a V2X frequency of HPLMN mapped to service x
3: UE: Receiving V2X system information
  RX pools for serving cell and inter-frequency neighbor cell per PPPP/PPPR
  TX pool for serving cell per PPPP/PPPR
4: V2X packet occurs for transmission
5: UE determines PPPP, PPPR and PPPI to be applicable for the V2X packet based on which service the packet is for
6: UE selects Tx Pool based on PPPP/PPPR of the packet
7: UE selects SLRB based on SRC/DST/PPPR/PPPI/PPPP
  SLRB is mapped with combination of SRC/DST/PPPI
  If no SLRB matches with SRC/DST/PPPI of the V2X packet, create new SLRB.
8: UE process V2X packet in the PDCP layer
  If PPPI is 1, calculate MAC-I, append it at the end of V2X packet. 1-bit indicator in PDCP header is configured to 1 to indicate the presence of MAC-I
9: UE transmits V2X packet using the Tx Pool selected based on PPPP/PPPR In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
  receiving logged measurement configuration information including a logging duration value for a first timer;
  performing a logging of measurement in a radio resource control (RRC) inactive state based on the logged measurement configuration while the first timer is running;
  transmitting, to a base station, an RRC resume request message, wherein the transmitting comprises starting a second timer;
  receiving, from the base station, an RRC resume message before an expiry of the second timer; and
  transmitting, to the base station, an RRC resume complete message, the RRC resume complete message including first information indicating that a logged measurement is stored in the terminal.

2. The method of claim 1, further comprising:
  receiving, from the base station, a request message requesting to report the logged measurement; and
  transmitting, to the base station, a response message including information on the logged measurement,
  wherein the measurement includes a minimization of drive test (MDT), and
  wherein the information on the logged measurement includes a measured quantity result of a cell which has a signal strength above a threshold for a beam.

3. The method of claim 1, wherein, in case that the RRC resume message is not received until the second timer expires, stored measurement information associated with a previous resume failure is deleted and measurement information associated with a resume failure is stored.

4. The method of claim 3, wherein the RRC resume complete message further includes second information indicating that the measurement information associated with the resume failure is stored in the terminal.

5. A terminal in a wireless communication system, the terminal comprising:
  a transceiver configured to transmit and receive a signal; and
  a controller configured to:
    receive logged measurement configuration information including a logging duration value for a first timer,
    perform a logging of measurement in a radio resource control (RRC) inactive state based on the logged measurement configuration while the first timer is running,
    transmit, to a base station, an RRC resume request message, wherein the controller starts a second timer with regard to the transmission of the RRC resume request message,
    receive, from the base station, an RRC resume message before an expiry of the second timer, and transmit, to the base station, an RRC resume complete message, the RRC resume complete message including first information indicating that a logged measurement is stored in the terminal.

6. The terminal of claim 5, wherein the controller is further configured to:
receive, from the base station, a request message requesting to report the logged measurement, and
transmit, to the base station, a response message including information on the logged measurement,
wherein the measurement includes a minimization of drive test (MDT), and
wherein the information on the logged measurement includes a measured quantity result of a cell which has a signal strength above a threshold for a beam.

7. The terminal of claim 5, wherein, in case that the RRC resume message is not received until the second timer expires, stored measurement information associated with a previous resume failure is deleted and measurement information associated with a resume failure is stored.

8. The terminal of claim 7, wherein the RRC resume complete message further includes second information indicating that the measurement information associated with the resume failure is stored in the terminal.

9. A method performed by a base station in a wireless communication system, the method comprising:
transmitting, to a terminal, logged measurement configuration information including a logging duration value for a first timer, wherein the first timer is used for performing a logging of measurement in a radio resource control (RRC) inactive state while the first timer is running;
receiving, from the terminal, an RRC resume request message based on a second timer;
transmitting, to the terminal, an RRC resume message before an expiry of the second timer; and
receiving, from the terminal, an RRC resume complete message, the RRC resume complete message including first information indicating that a logged measurement is stored in the terminal.

10. The method of claim 9, further comprising:
transmitting, to the terminal, a request message requesting to report the logged measurement; and
receiving, from the terminal, a response message including information on the logged measurement,
wherein the measurement includes a minimization of drive test (MDT), and
wherein the information on the logged measurement includes a measured quantity result of a cell which has a signal strength above a threshold for a beam.

11. The method of claim 9,
wherein, in case that the RRC resume message is not received until the second timer expires, stored measurement information associated with a previous resume failure is deleted and measurement information associated with a resume failure is stored.

12. The method of claim 11, wherein the RRC resume complete message further includes second information indicating that the measurement information associated with the resume failure is stored in the terminal.

13. A base station in a wireless communication system, the base station comprising:
a transceiver configured to transmit and receive a signal; and
a controller configured to:
transmit, to a terminal, logged measurement configuration information including a logging duration value for a first timer, wherein the first timer is used for performing a logging of measurement in a radio resource control (RRC) inactive state while the first timer is running,
receive, from the terminal, an RRC resume request message based on a second timer,
transmit, to the terminal, an RRC resume message before an expiry of the second timer, and
receive, from the terminal, an RRC resume complete message, the RRC resume complete message including first information indicating that a logged measurement is stored in the terminal.

14. The base station of claim 13, wherein the controller is further configured to:
transmit, to the terminal, a request message requesting to report the logged measurement, and
receive, from the terminal, a response message including information on the logged measurement,
wherein the measurement includes a minimization of drive test (MDT), and
wherein the information on the logged measurement includes a measured quantity result of a cell which has a signal strength above a threshold for a beam.

15. The base station of claim 13, wherein, in case that the RRC resume message is not received until the second timer expires, stored measurement information associated with a previous resume failure is deleted and measurement information associated with a resume failure is stored.

16. The base station of claim 15, wherein the RRC resume complete message further includes second information indicating that the measurement information associated with the resume failure is stored in the terminal.

* * * * *